(12) United States Patent
Donohue

(10) Patent No.: US 12,491,731 B2
(45) Date of Patent: Dec. 9, 2025

(54) RESILIENT WHEELS

(71) Applicant: Patrick Donohue, Portland, OR (US)

(72) Inventor: Patrick Timothy Donohue, Portland, OR (US)

( * ) Notice: Subject to any disclaimer, the term of this patent is extended or adjusted under 35 U.S.C. 154(b) by 2 days.

(21) Appl. No.: 19/007,120

(22) Filed: Dec. 31, 2024

(65) Prior Publication Data

US 2025/0289264 A1 Sep. 18, 2025

Related U.S. Application Data

(60) Provisional application No. 63/564,367, filed on Mar. 12, 2024.

(51) Int. Cl.
| | |
|---|---|
| *B60B 9/04* | (2006.01) |
| *B60B 9/26* | (2006.01) |
| *B60B 19/04* | (2006.01) |
| *B60B 27/00* | (2006.01) |
| *B60C 7/24* | (2006.01) |

(52) U.S. Cl.
CPC ............ *B60B 9/04* (2013.01); *B60B 9/26* (2013.01); *B60B 19/04* (2013.01); *B60B 27/0047* (2013.01); *B60C 7/24* (2013.01)

(58) Field of Classification Search
CPC .. B60B 9/04; B60B 9/26; B60B 19/04; B60B 27/0047; B60C 7/107; B60C 7/24
See application file for complete search history.

(56) References Cited

U.S. PATENT DOCUMENTS

| | | | | |
|---|---|---|---|---|
| 1,297,287 | A | * 3/1919 | Worsley | B60B 9/26 152/76 |
| 2,525,196 | A | * 10/1950 | Bacon | B60C 7/24 152/323 |
| 5,492,390 | A | * 2/1996 | Kugelmann, Sr. | B60B 19/00 301/5.1 |
| 2004/0051373 | A1* | 3/2004 | Tolkachev | B60B 9/26 301/55 |
| 2004/0069385 | A1* | 4/2004 | Timoney | B60B 9/26 152/69 |

(Continued)

FOREIGN PATENT DOCUMENTS

CN 104786731 A * 7/2015

OTHER PUBLICATIONS

Kieron Marchese; designboom Jun. 26, 2018; https://www.designboom.com/technology/darpa-reconfigurable-wheel-track-technology-06-26-2018/ p. 1; access date Feb. 6, 2025.

(Continued)

*Primary Examiner* — Kip T Kotter
(74) *Attorney, Agent, or Firm* — Carnelian Law, LLC

(57) ABSTRACT

A resilient wheel and a method for traversing an obstruction therewith are disclosed. The wheel comprises a hub assembly, a flexible rim, and a spoke band assembly extending from the hub assembly to the flexible rim to form spokes. Each spoke has a spoke length defined to be a distance along the spoke from a point of contact of the spoke on the flexible rim to a point of origin of the spoke at the hub assembly. The spoke band assembly is configured such that contact of the flexible rim with an object as the wheel moves forward causes the spoke length of a number of the spokes to shorten and the spoke length of an equal number of the spokes to lengthen.

20 Claims, 22 Drawing Sheets

(56) References Cited

U.S. PATENT DOCUMENTS

| | | | | |
|---|---|---|---|---|
| 2010/0230022 A1* | 9/2010 | Kim | ................. | B60C 7/107 |
| | | | | 152/310 |
| 2013/0167991 A1* | 7/2013 | Donohue | ............ | B60B 21/00 |
| | | | | 152/5 |
| 2016/0114623 A1* | 4/2016 | Smith | ............... | B60B 3/147 |
| | | | | 29/894.31 |
| 2023/0356542 A1* | 11/2023 | Rasal | ................. | B60B 9/26 |

OTHER PUBLICATIONS

Brett T. Evans; Jun. 25, 2018 https://www.motortrend.com/news/1806-darpa-builds-a-shape-shifting-wheel-that-doubles-as-tank-track/ p. 8 and 9; access Feb. 6, 2025.
Bryan Spice; Oct. 29, 2018 https://www.cmu.edu/news/stories/archives/2018/october/reinventing-wheel.html; p. 1; access date Feb. 7, 2025.
Donohue Resilient Wheels DRW025 image—date disclosed Apr. 3, 2014; www.donohueresTITentwheels.com; p. 3; access date Feb. 6, 2025.
Mizokami, Kyle; DARPA invents wheels that instantly morph into triangular tank tracks; https://www.popularmechanics.com/military/a21932118/darpa-wheels-become-tank-tracks/; access date Feb. 6, 2025; p. 2.

* cited by examiner

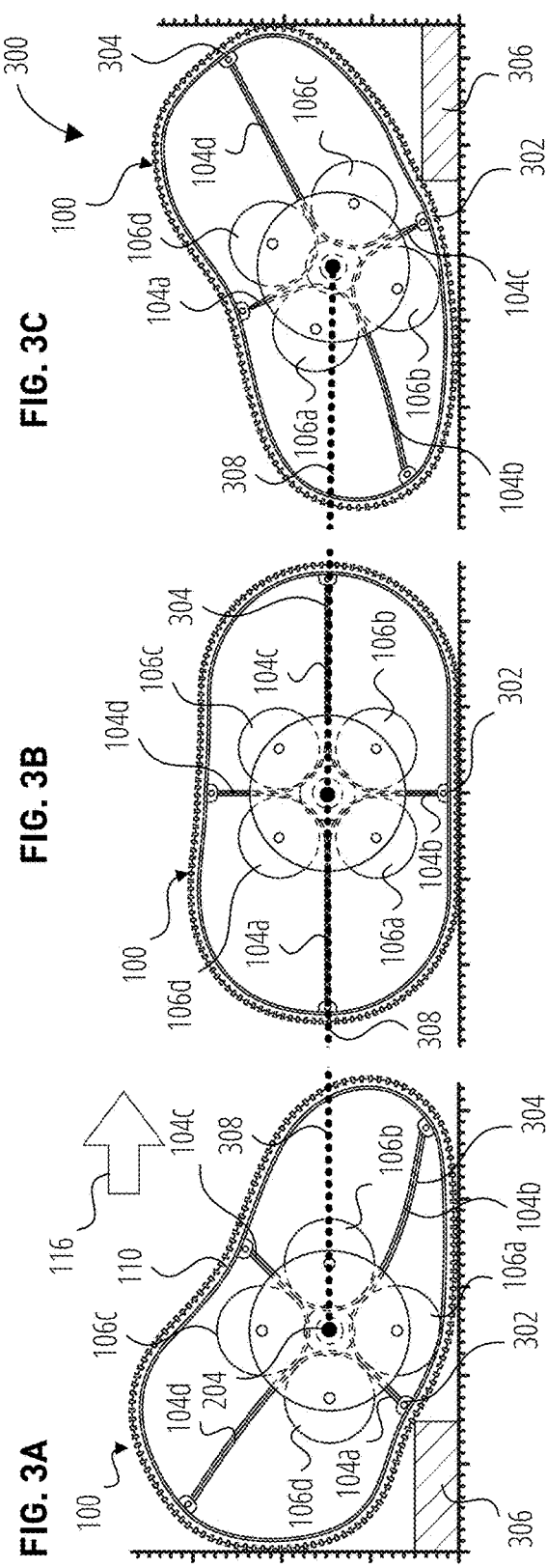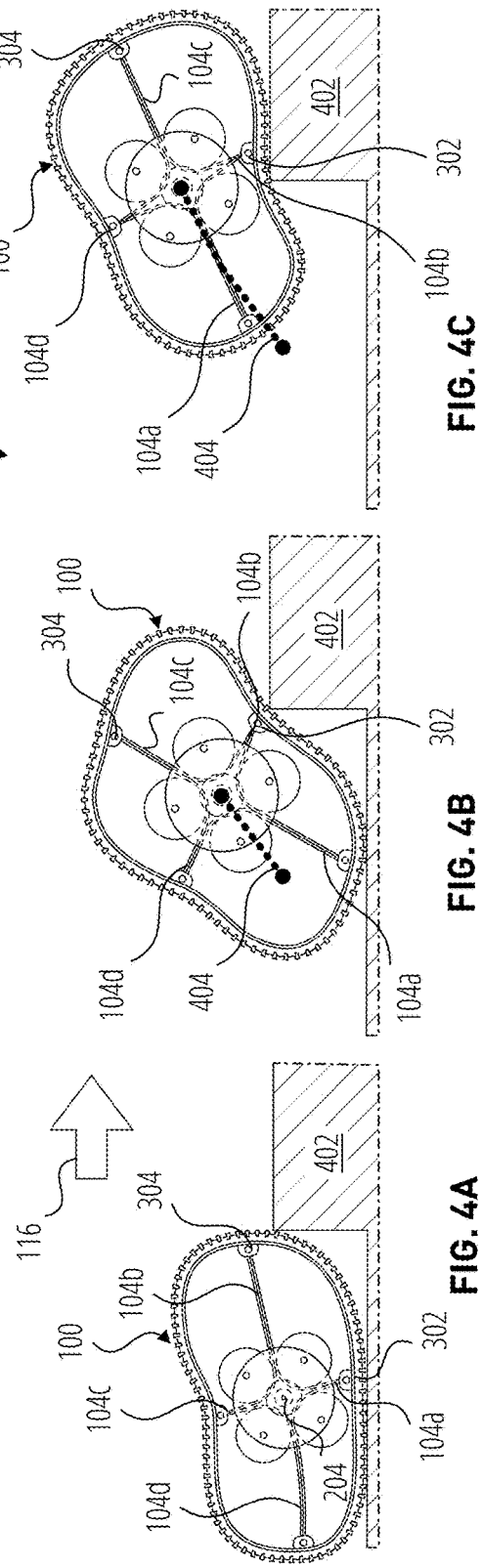

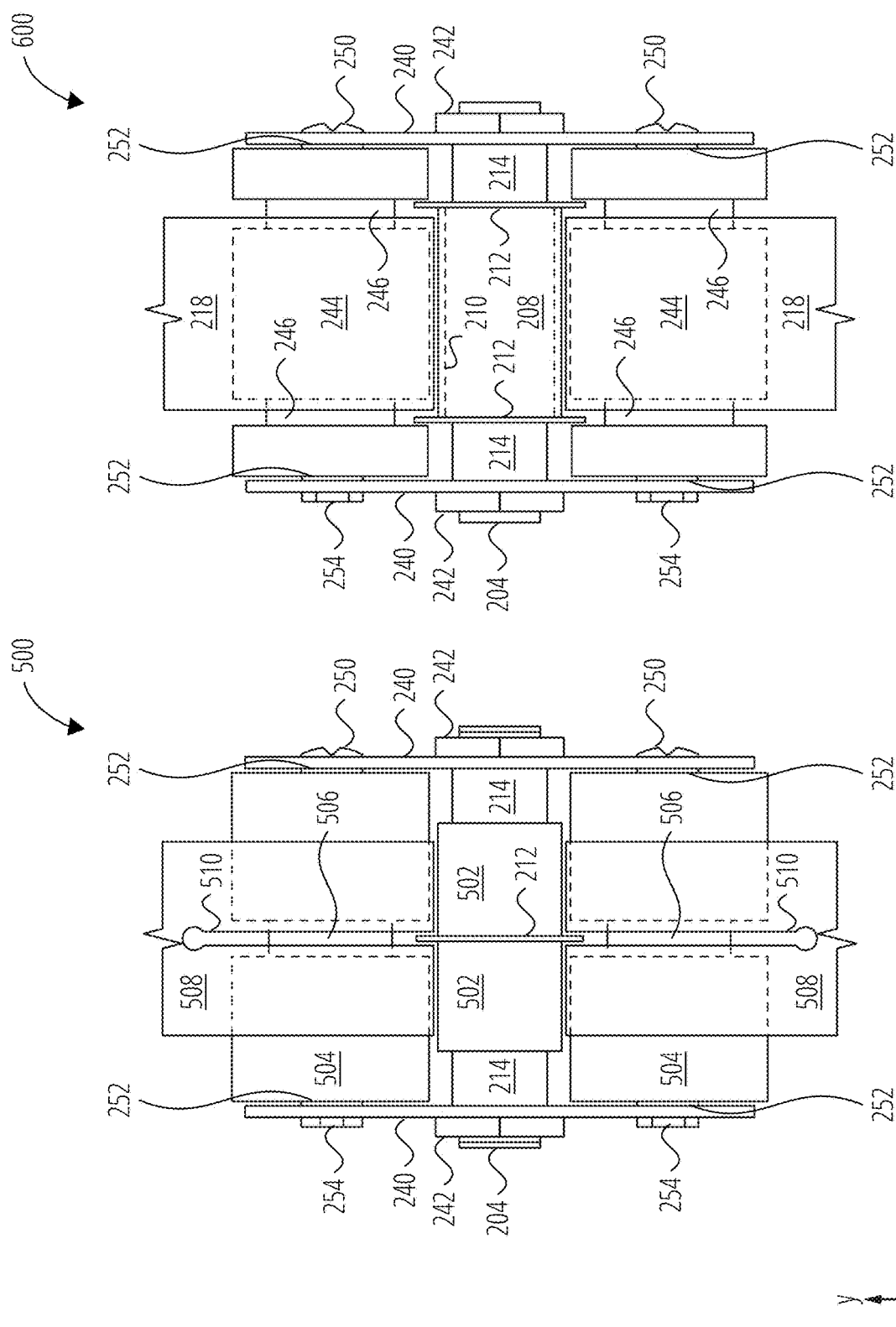

RESILIENT WHEELS

CROSS-REFERENCE TO RELATED APPLICATIONS

This application claims the benefit of U.S. provisional patent application Ser. No. 63/564,367, filed on Mar. 12, 2024, the contents of which are incorporated herein by reference in their entirety.

BACKGROUND

Wheels and tracks are a primary source of propulsion and/or motion for a variety of vehicles and applications. These devices may rotate freely or may be driven under torque through applied power. Conventional wheels consist of a hub or axle housing, a rim, and a tire. Some conventional wheels have solid hubs extending to and incorporating the rim while others have spokes that connect the hub to the rim and transfer the rotational energy applied to the axle out to the rim and tire to induce motion across a terrain.

Under torque, these components are fixed in relationship to one another. There is no "play" with respect to the movement between the axle and the wheel. In "free play" rotation, there is movement between the wheel itself and the axle. Free play motion may have adverse effects, such as causing the wheel to rotate out of alignment. Spokes for a wheel are generally in balance and in alignment with the wheel proper when it is manufactured. Since the components do not move with respect to one another under torque, there is generally no problem with alignment in such cases.

Conventional wheels and tracks tend to churn the terrain they move over. Wheel designs thus could benefit from a greater capability to adapt to the terrain while maintaining stability and forward progress.

BRIEF SUMMARY

In one aspect, a wheel, includes a hub assembly, a flexible rim, a spoke band assembly extending from the hub assembly to the flexible rim to form a plurality of single-band spokes. The spoke band assembly includes a plurality of distinct spoke bands, where each spoke of the plurality of single-band spokes is formed from the plurality of distinct spoke bands separated apart by a plurality of single band diverters and a plurality of dual band diverters. The plurality of single band diverters and the plurality of dual band diverters are part of the hub assembly. Each spoke has a spoke length defined to be a distance along the spoke from a point of contact of the spoke on the flexible rim to a point of origin of the spoke at the hub assembly. The spoke band assembly is configured such that contact of the flexible rim with an object as the wheel moves forward causes the spoke length of a number of the spokes to shorten and the spoke length of an equal number of the spokes to lengthen.

In one aspect, a wheel, includes a hub assembly, a flexible rim, a spoke band assembly extending from the hub assembly to the flexible rim to form a plurality of spokes. The spoke band assembly includes a plurality of spoke bands, spoke hinge assemblies including universal hinge joints, configured to attach each spoke of the plurality of spokes to the flexible rim. Each spoke is formed from the plurality of spoke bands separated apart by a plurality of diverters, where the plurality of diverters are part of the hub assembly. Each spoke has a spoke length defined to be a distance along the spoke from a point of contact of the spoke on the flexible rim to a point of origin of the spoke at the hub assembly. The spoke band assembly is configured such that contact of the flexible rim with an object as the wheel moves forward causes the spoke length of a number of the spokes to shorten and the spoke length of an equal number of the spokes to lengthen.

In one aspect, a wheel, includes an axle assembly, including a central axle, and at least one spoke band retention flange configured to align a plurality of spoke bands across a surface of a plurality of diverters. The wheel also includes a hub assembly, including the axle assembly, and the plurality of diverters. The wheel also includes a flexible rim. The spoke band assembly extends from the hub assembly to the flexible rim to form a plurality of spokes, each spoke being formed from the plurality of spoke bands separated apart by the plurality of diverters. Each spoke has a spoke length defined to be a distance along the spoke from a point of contact of the spoke on the flexible rim to a point of origin of the spoke at the hub assembly. The spoke band assembly is configured such that contact of the flexible rim with an object as the wheel moves forward causes the spoke length of a number of the spokes to shorten and the spoke length of an equal number of the spokes to lengthen. The at least one spoke band retention flange aligns the spoke band assembly into one central plane normal to the central axle.

In one aspect, a method includes approaching an obstruction with a wheel such as the wheels disclosed herein. The method also includes traversing over the obstruction through rotation of the wheel and wave motion of the wheel, where the wave motion includes a complementary shortening and elongating of the plurality of single-band spokes as the hub assembly travels along an advance spoke and the advance spoke rotates downward and becomes a grounded spoke, where the advance spoke is elongated and the grounded spoke is shortened.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3A-FIG. 3C illustrate exemplary wave motion 300 in accordance with one embodiment.

FIG. 4A-FIG. 4C illustrate exemplary wave motion 400 in accordance with one embodiment.

FIG. 5A and FIG. 5B illustrate a single retention flange hub assembly detail 500 in accordance with one embodiment.

FIG. 6 illustrates a double retention flange hub assembly detail 600 in accordance with one embodiment.

DETAILED DESCRIPTION

Preliminaries

Figure 1A:
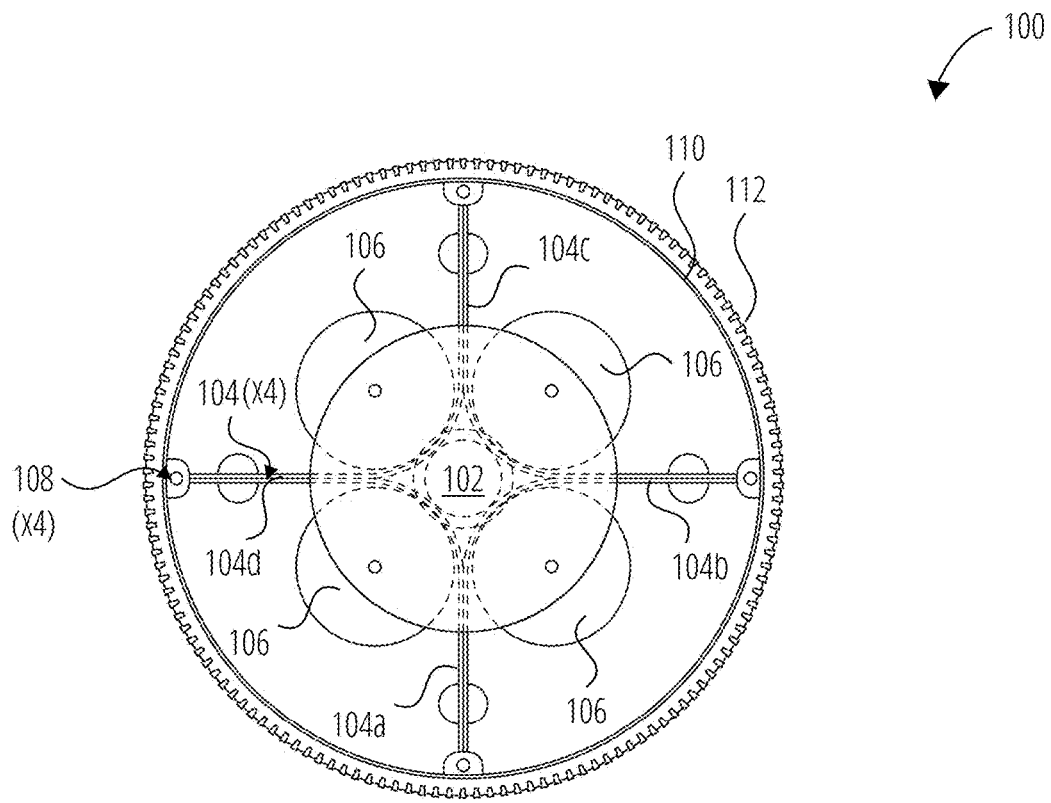
FIG. 1A and FIG. 1B illustrate a resilient wheel 100 in accordance with one embodiment.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

Overview

Embodiments of a wheel are described, having a load-bearing (central) axis that shifts horizontally in a uniform horizontal plane as it moves across the terrain. The wheel includes a central hub and a flexible rim. A drive band configuration for the wheel includes flexible bands extending as spokes from the central hub to the flexible rim. The hub and band configuration are configured to cause the flexible rim to flex toward and away from the hub as the wheel moves. The wheel thus tends to unfold over the terrain, rather than churn the terrain as would a conventional wheel.

Technological Improvements

The disclosed solution comprises a number of improvements over existing and conventional wheel technologies, which are described in greater detail below, including:
A. Improved Hub Action
B. Spoke Motion Governor
C. Universal Hinge Spoke Attachment to the Flexible rim
D. Adapter Plate Wheel Attachment
E. Adhesive-Backed Tire Recap Strips for Resilient Wheels Hub Action This disclosure includes the action of diverters, which are cylindrical pivots within a hub assembly that transfer rotational power and movement of the central axle to the flexible rim of the resilient wheel through spokes formed from flexible spoke bands diverted in their motion by the diverters. The spoke bands in turn anchor themselves against the surfaces of their diverters and rotate in unison with the diverters. In one embodiment, spoke bands may be manufactured from strips of thin, flexible carbon-steel, such as 1095 carbon spring steel. The spoke bands may also be manufactured from stainless steel 304 and 440c.

Spoke band retention flanges may be incorporated into an axle assembly. In one embodiment, the spoke band retention flanges may be carbon steel washers. The spoke band retention flanges may align the spoke bands across the surface of their diverters, preventing them from drifting sideways off of their diverters' surfaces. To accomplish this, the outside diameter of the spoke band retention flanges when mounted within the hub assembly may extend slightly beyond the curved apex of the spoke bands as they encircle their diverters, and may extend into retention flange gaps configured in the diverters.

In one embodiment, two spoke band retention flanges may be separated to create a non-interference gap that is wider than the width of the spoke bands. The central axle and two spoke band retention flanges may be sized and positioned using spacers such that the spoke band retention flanges enclose the spoke bands when the hub is assembled. In another embodiment, a single spoke band retention flange may be held centrally along the shaft of the central axle using spacers, the diverters may each have a single retention flange gap, and the spoke bands may incorporate retention flange slits, through which the spoke band retention flange may extend into the retention flange gaps of the diverters.

In this manner the single spoke band retention flange may retain all spoke bands in a centered position with respect to the axle assembly and hub assembly and may thus confine all of the spoke bands to a single plane of motion. Centralizing the plane of rotational motion may reduce the friction of the spoke bands against the spoke band retention flanges, improving the efficiency of motion of the resilient wheel and reducing wear on the components thereof. In one embodiment, each spoke band may experience ¹⁄₃₂" of drift from its centered position before it contacts a spoke band retention flange, restricting further drift.

Each diverter may be positioned within the hub through mounting using its own axle and spacers. These may be configured to prevent the diverters from contacting the central axle, the spacers of the axle assembly, or the spoke band retention flanges. Further, the axle assembly may include a central non-interference spacer between the two spoke band retention flanges (or two such spacers which also centralize a single spoke band retention flange) having an outside diameter sized to fall just short of rubbing against the spoke bands as they rotate around their diverters. Such spacers may act as a stop for spoke bands moving in-line at their apexes beyond the diameters of their diverters. In one embodiment, a non-interference spacer sleeve may enclose the non-interference spacer. The non-interference spacer may be of metal, and the non-interference spacer sleeve may be of a friction-reducing material.

Spoke Motion Governor

When the resilient wheel is under load, the near elliptical shape deflections of the four-spoke wheel and the near triangular configuration of the six-spoke wheel reach a limit due to the rigidity of the rim. In one embodiment, the flexible rim may be made of carbon steel. The thicker the gage is of the steel flexible rim, the less it will bend. It does reach a limit in bending.

This flexible rim may be configured to allow the resilient wheel to rotate with a longer linear surface contact with the terrain. In one embodiment, this may be accomplished by increasing the linear length of the flexible rim, beyond the circumference of a true circle that fits the wheel. Increasing the circumference by 4.9% for a four-spoke resilient wheel and 1.5% for a six-spoke resilient wheel are examples to achieve this effect.

In addition, the spokes may limit the flexing action of these wheels as they rotate. In exemplary embodiments, this may be accomplished by strategically mounting opposing half-round anchors on both sides of each spoke band to form a circular abutment that may act as a spoke brake. The half-round spoke brake elements may be made of a plastic material or of a metal such as aluminum. They may be attached using screws or rivets. When attached, they may proactively limit spoke movement. Their main function may be limiting the size of stroke the spoke takes as the flexible rim deflects in rotation. The spoke brakes may allow for more options in using thinner gage steel spoke bands with different hub sizes and wheel load applications.

Universal Hinge Spoke Attachment to the Flexible Rim

In exemplary embodiments, a universal hinge joint may attach each spoke to the flexible rim of the resilient wheel. The universal hinge joint may allow pivoting of the attached spoke both in-line and at right-angles to the line of travel of the wheel. In this manner, the tire may deflect to either side while rotating. Since the flexible rim may resist this deflection, it may spring back with resilience to an undeflected, inline position. This action enhances the contact of the resilient wheel tire with the terrain.

The universal hinge joint draws the two right-angle pivots of the hinge close together. This may be accomplished by incorporating a hinge collar at the end of each spoke. The hinge collar may have a circular orifice for pivoting in-line with the flexible rim. It may be fitted with a thin hinge collar sleeve to enhance a non-interference, swivel action. The hinge collar sleeve may be metal, and may have an orifice that receives a coiled tension pin that freely slips into the orifice and serves as an axel, anchoring the hinge collar, attached to the spoke, to a hinge housing attached to the wheel flexible rim.

In addition, the other end of the hinge collar may have a centered hole to receive a shouldered fastener, such as a machine screw or rivet, for attachment to the spoke. The shouldered fastener may pass through a similar centered hole at the end of each spoke. The ends of the spoke bands forming the spokes may be configured to be ovate or elliptical. This may allow the spoke to swing within the hinge collar in a limited arc. In this manner, the spoke may pivot, through a limited arc, at right angles to the in-line motion of the flexible rim. Once the metal collar oscillates to a set degree of arc with respect to the spoke, the oval end of the spoke abuts with the internal, circular sleeve for pivoting. The oscillation comes to an end. This design may prevent the spoke from buckling sideways with respect to the flexible rim.

In an exemplary embodiment, the tension pin itself and the orifice housing end may be centered within a hinge housing as previously described. The hinge housing may be a machined-to-fit piece of metal C-Channel Bar. The hinge housing may be anchored to the wheel flexible rim at its base with screws or rivets. The tension pin may anchor itself to the C-Channel bar by squeezing tight through centered holes on both sides of the C-Channel bar. The hinge collars may thus be attached within the metal C-Channel bar form a collapsed, low profile universal hinge joint.

In one embodiment, the location where the flexible rim joins with one of the hinge housings may be where the two ends of the flexible rim join together to form a circle. This overlap of the flexible rim may be secured by the same screws/rivets along with epoxy or brazing of the flexible rim overlap.

The resilient wheel having the universal hinge joints may thus tilt transversely with the irregular gradient of the terrain, spreading its load uniformly across its entire tire surface. This may reduce stresses caused by uneven contact with the terrain. In addition, traction may improve through compression of the sloped terrain between tilted tires or by their outward contact with this irregular terrain.

Adapter Plate Wheel Attachment

In one embodiment, an adapter assembly may be used to attach a resilient wheel to the face of a standard brake drum of a vehicle. If the resilient wheel either rotates freely or is powered through a drive-line axle, then no adapter-plate may be needed to function. The adapter assembly may have a centered, recessed dome in order to not interfere with the caped bearing end of a central drive-line axle. At its center the adapter assembly may have an exterior grooved spline that extends outward. It receives the matching interior groove of the central, tubular axle of the resilient wheel.

The grooved spline may attach to the circular, steel-dome housing, which may be pressed to fit the "face" of the standard brake drum. In exemplary embodiments, the spline (rod or tubing) may be machined from steel to form a grooved exterior to match the grooved orifice-opening of a resilient wheel hub. Its two ends may be threaded to receive either machine bolts or nuts. The machined spline may then be fitted onto the dome housing and welded in place. In light duty applications, the spline may be an elongated coupling nut (with adjoining fasteners) that is welded onto the dome housing. The threaded end of the grooved spline may allow for a castle nut (with a cotter pin) or flanged bolt (with a lock or wave washer) to lock it into place.

Mounting the adapter assembly onto the standard brake drum may involve a similar amount of time and effort as mounting a standard wheel. Additional effort needed for installation may include sliding the hub of the resilient wheel onto the spline and securing it with either a flanged bolt or a castle nut.

Adhesive-Backed Tire Recap Strips for Resilient Wheels

In exemplary embodiments, the tires for resilient wheels may be fused directly onto the flexible rim of the wheel using standard vulcanization techniques for bonding rubber with sulfur, heat, and pressure. This technology may utilize transverse holes through the solid rubber tire to allow it to normally compress and retract when driven over the terrain.

In an additional embodiment, a tire may be mounted onto the flexible rim of a resilient wheel as an adhesive-backed, composite rubber strip. This strip may have peel back removable layer that may be peeled off to expose an adhesive inner layer for mounting directly onto the flexible rim. A treaded outer layer of the strip may comprise a band of Fabric-reinforced, neoprene rubber having a standard tire tread. The fiber strands may comprise a number of possible threads for reinforcement. Common examples may be cotton/polyester, nylon, and steel wire.

In an exemplary embodiment, the composite rubber strip may comprise three rubber layers bonded together. The adhesive inner layer may comprise a lower-durometer neoprene rubber strip with an outer adhesive surface. A tubing layer of this composite strip may comprise transverse plastic/rubber tubes that may be full-round, half-round, hexagonal, solid, hollow, etc. The tubing layer may be formed from any of a family of material includes thermoplastic elastomer (TPE) and thermoplastic vulcanizate (TPV), or materials similar in flexibility, resilience, and durability. TPV is a mixture of polypropylene and ethylene propylene diene monomer (EPDM) rubber. One such material family is known commercially as Santoprene®. The group including continuous-flex Santoprene is noted for enhanced flexibility and superior memory characteristics. Half-round rubber versions of these composite strips have been found to produce superior flexibility for the whole tire itself. The two legs of the half-round rubber tubes may face the adhesive inner layer of the terrain conforming tire strip. They may collapse and retract in a cyclical fashion.

The terrain conforming tire strip may be mated and adhered with the flexible rim of the resilient wheel. Its length may be equal to the circumference of the flexible rim, allowing its two ends to butt together. Cyanoacrylate glue (commonly known as super glue) may be applied to this junction, permanently joining and bonding the two ends together.

These improvements are described in additional detail below with respect to the figures and the embodiments they illustrate.

DETAILED DESCRIPTIONS OF PARTICULAR EMBODIMENTS

Figure 1B:
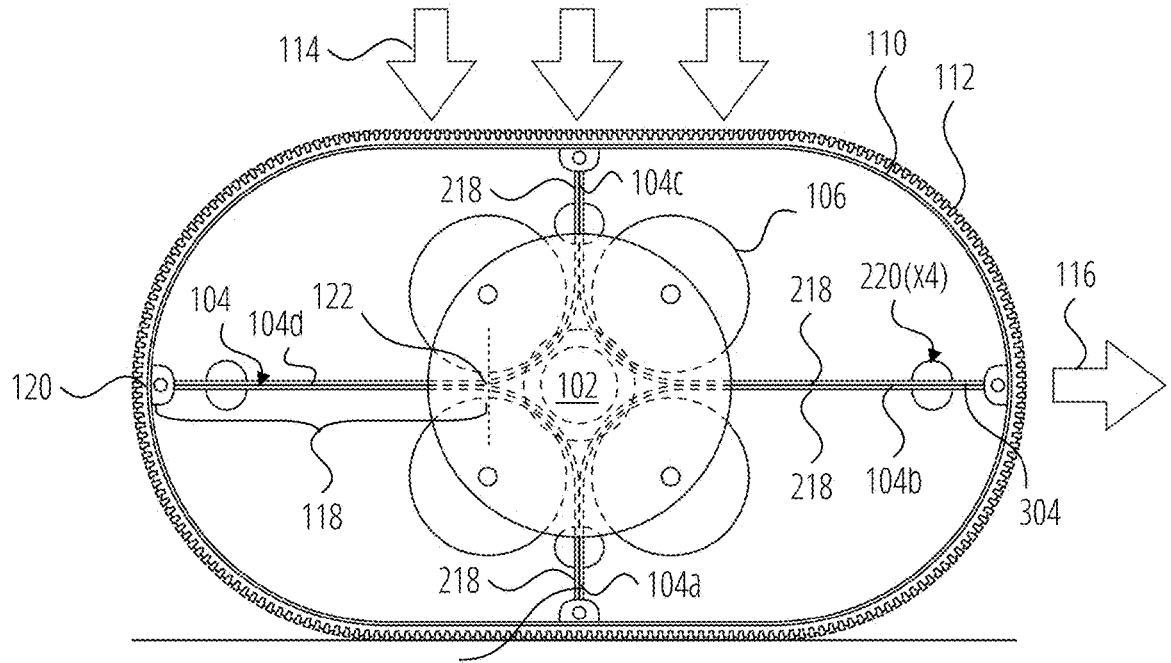

FIG. 1A and FIG. 1B illustrate a resilient wheel 100 in accordance with one embodiment. The resilient wheel 100 may comprise a wheel hub 102, four or more wheel spokes 104, four or more diverters 106 symmetrically arranged around a central axle of the wheel hub 102, universal hinge joints 108 attaching each wheel spoke 104 to a flexible rim 110, and a tire 112 affixed to the outer surface of the flexible rim 110.

Note that for simplicity, and because of the symmetry of the disclosed design, not all instances of all elements of the resilient wheel 100 are explicitly called out in each figure. For example, FIG. 1A annotates one of the universal hinge joints 108, though each of the four wheel spokes 104 shown may be seen to connect to the flexible rim 110 through a universal hinge joint 108 of its own. It is expected throughout this application that one of ordinary skill in the art will immediately recognize the multiple instances of a resilient wheel 100 element illustrated without reference to independent annotations for each.

In the resilient wheel 100 illustrated here, each wheel spoke 104 is formed from conjoined ends of two adjacent spoke bands 218, as may be seen in FIG. 1B. The spoke bands 218 may be separated apart by the diverters 106. Each spoke may have a spoke length defined to be a distance along the spoke from a point of contact 120 of the spoke on the flexible rim 110 to a point of origin 122 of the spoke at the wheel hub 102 hub assembly. The spokes 104a-104d may be formed from a spoke band assembly, described in greater detail below, which is configured such that contact of the flexible rim with an object as the resilient wheel 100 moves forward causes the spoke length of a number of the spokes to shorten and the spoke length of an equal number of the spokes to lengthen. This is described in greater detail with respect to FIG. 3A-FIG. 4C.

Spoke brake assemblies 220 connect the adjacent spoke bands 218 to form a single wheel spoke 104 from the two connected ends of the spoke band 218. In some embodiments, the spoke brake assemblies 220 may be omitted. The spoke brake assemblies 220 may act as a break for the wheel. They may allow the resilient wheel 100 to adjust for different load capacities and utilize spokes having different gauges for their spoke size.

Figure 5A:
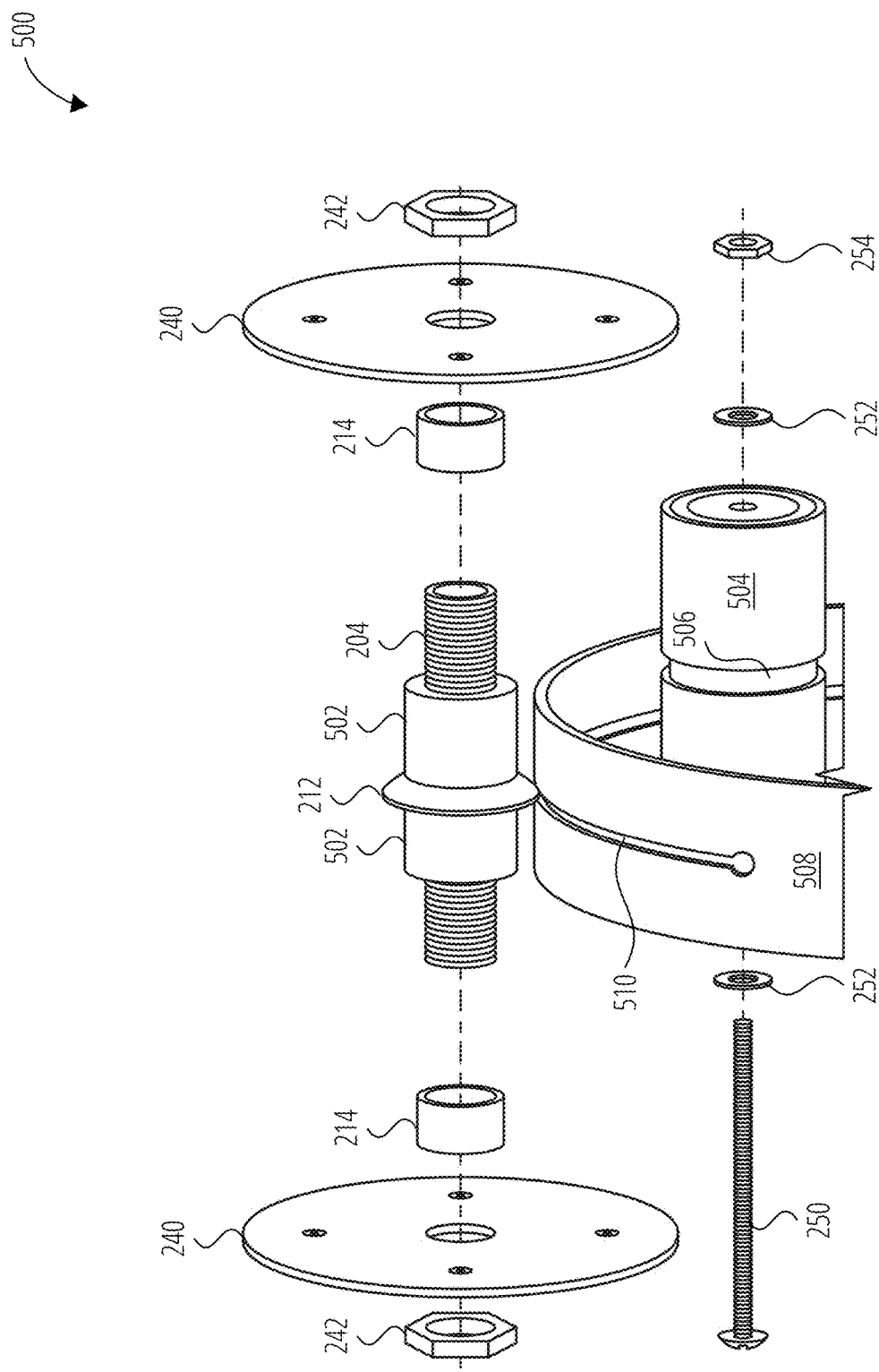

In this manner, a four spoke four band resilient wheel 100 may be formed. Such a resilient wheel 100 may be constructed as illustrated in FIG. 2A-FIG. 2E. FIG. 5A, FIG. 5B, and FIG. 6 illustrate details of the improved hub action previously discussed, as embodied in the wheel hub 102. Additional embodiments configured with differing numbers of spokes and spoke bands are anticipated and additional embodiments are illustrated in FIG. 12A-FIG. 18. Each operate similarly to the actions described herein with respect to resilient wheel 100.

Figure 9:
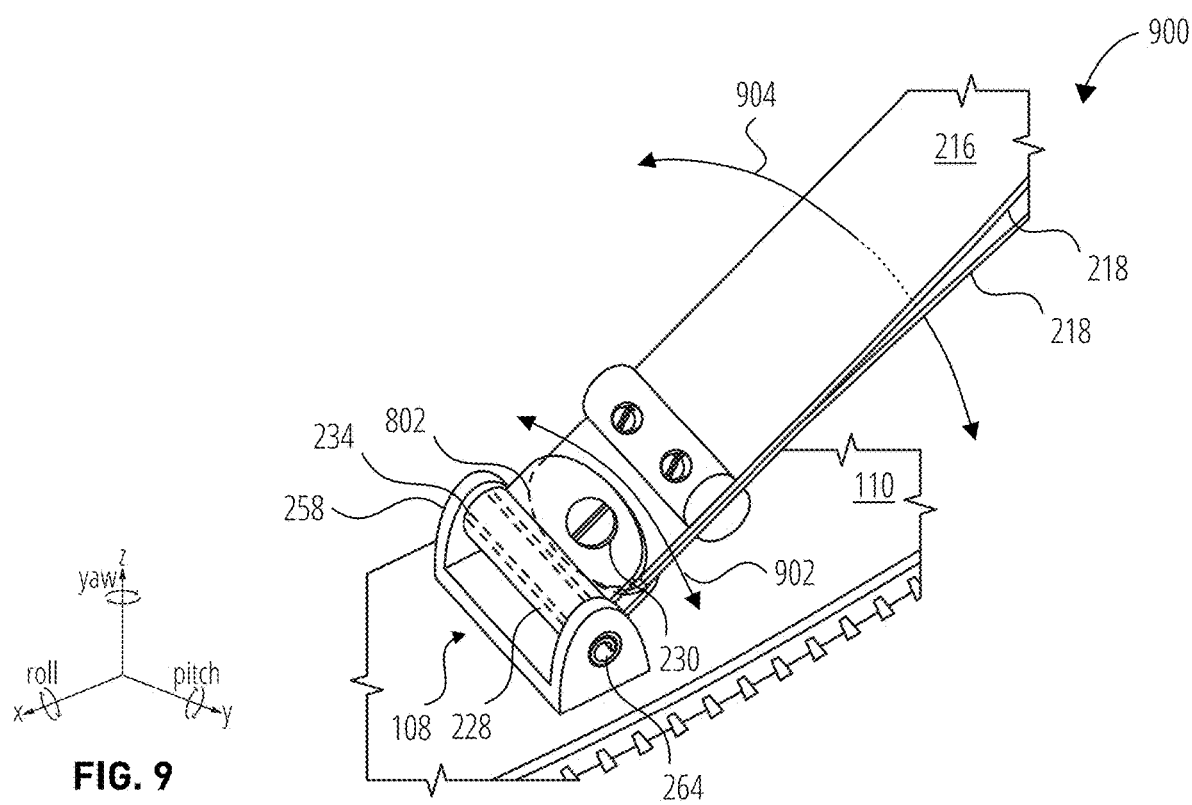
FIG. 9 illustrates a universal hinge joint motion 900 in accordance with one embodiment.

FIG. 9 illustrates in greater detail the operation of the universal hinge joints 108 shown here attaching the wheel spokes 104 to the flexible rim 110. These components may be manufactured from stainless steel or other materials appropriate to the durability needed for the resilient wheel 100 to perform reliably in its expected application. The flexible rim 110 may be a carbon steel band. This band may have nearly 100% memory when bent. As the resilient wheel 100 rotates over obstructions in its path, the flexible rim 110 may deflect inward, then return to its previous configuration after the obstructions are past. In this manner, the flexible rim 110 acts as a resilient anchor for the wheel components, namely, the wheel spoke 104 and the wheel hub 102. These are held in place at or in positions leading to the center of the resilient wheel 100.

The tire 112 may be a rubber liner affixed to the flexible rim 110. In one embodiment, the tire 112 may be a terrain conforming tire such as is described in detail with respect to FIG. 21. The design of the resilient wheel 100 allows it to traverse rough terrain with the agility of a universal wheel and the climbing and descent ability of a track at a slow pace. The mechanism of the hub and the flexibility of the rim uniquely utilizes the deformation of the rim to broaden the surface area or "footprint" along which the resilient wheel 100 tire 112 contacts the terrain, improving stability and traction.

FIG. 1A illustrates the resilient wheel 100 under no-load conditions. FIG. 1B illustrates the resilient wheel 100 with loading forces 114 applied. The application of loading forces 114 results in a compression of the resilient wheel 100 along the direction of the loading force 114, causing a four spoke wheel to elongate from a more circular configuration into a more elliptical configuration, spreading the area across which the loading forces 114 are transmitted to the underlying terrain. This elongation and shortening of the spokes is supported by the flexibility of the flexible rim 110. The spoke band assemblies may be configured such that contact of the flexible rim 110 with an object as the wheel moves forward causes the spoke length 118 of a number of the wheel spokes 104 to further shorten and the spoke length 118 of an equal number of the wheel spokes 104 to elongate. "Spoke length" refers to a distance along the spoke from a point of contact of the spoke on the flexible rim to a point of origin of the spoke at the hub assembly.

When these resilient wheels 100 are under load, their pattern in rotation changes. The resilient wheel 100 may change from circular to a formation determined by the number of its wheel spokes 104. Generally, the resilient wheel 100 may lower in elevation toward the terrain. The central wheel spoke 104 under the wheel hub 102 may shorten and the two adjacent wheel spokes 104 may elongate, as may be seen in FIG. 1B. This may cause the tire 112 to have a larger surface area in contact with the terrain. This may be characteristic for all of embodiments of the resilient wheel disclosed herein. When the wheel takes the shape of a ellipse (oval), these features may be at a maximum. Because these wheels rotate (under load) in a uniform manner and at a lower elevation above the terrain, they may exhibit wave motion in their rotation. Wave motion is the horizontal movement of the wheel hub 102 from the center of the wheel toward the rim along the advance spoke 304. Since these wheels maintain a uniform elevation in rotation, the wheel hub 102 may move toward the elongated advance spoke 304. The extent of this movement is the difference between the length of the elongated advance spoke 304 and the length of the shortened grounded spoke 302 directly below the wheel hub 102. The wheel hub 102 may be considered as pulled toward the elongated advance spoke 304 through the rotation of the wheel hub 102.

The deformation from the circular is determined by the amount of loading force 114, and is limited by the range of retraction and complementary extension of the spokes as well as the rigidity of the flexible rim 110. The deformation may additionally be controlled by spoke brake assemblies 220. The spoke brake assemblies 220 may limit the extent to which each spoke band 218 may move transversely with respect to its diverter, such as the diverters 106 included in the wheel hub 102, as is described above with respect to the Spoke Motion Governor. In this manner, the spoke brake assemblies 220 may set a minimum spoke length 118 to which each wheel spoke 104 may retract to.

As the resilient wheel 100, under loading forces 114, rotates in a direction of motion 116, a grounded spoke 302 may have its spoke length 118 be shortened by the loading forces 114, which causes a complementary elongation of the spoke length 118 of an advance spoke 304 as the spoke band 218 or spoke bands 218 included in these two wheel spokes 104 traverse across their single band diverters 244. As will be described in greater detail below, the diverters 106 separating the spoke bands 218 forming the wheel spokes 104 may be one of at least two types: single band diverters and dual band diverters. Single band diverters such as are shown here divert the motion of a single spoke band. Dual band diverters, as will be discussed in more detail below, divert the motion of two adjacent spoke bands.

The attachment of the spoke bands 218 to the flexible rim 110, the diversion of the spoke bands 218 by the diverters 106, and the connection of two adjacent spoke bands 218 at their ends to form single wheel spokes 104 in some embodiments, and the coupling of spoke bands 218 through the action of the hub and connection to the rim in others, results in the similar shortening and lengthening of the spokes opposite and adjacent to the grounded spoke 302 and advance spoke 304, respectively. The complementary lengthening and elongating of spoke pairs supports a wave motion that is crucial to the superior performance of the disclosed resilient wheels. Wave motion is illustrated and described in greater detail with respect to the exemplary wave motion 300 and exemplary wave motion 400 of FIG. 3A and FIG. 4A, below.

FIG. 2A-FIG. 2E illustrate resilient wheel assembly details 200 in accordance with one embodiment. The resilient wheel assembly details 200 illustrate the assembly of a resilient wheel 100. One of ordinary skill in the art will appreciate that the actions described need not be performed in the order in which they appear, but may vary insofar as they permit the construction of the assemblies described. Fasteners are shown as screws, but may also be rivets or other fasteners such as support the connections described. These fasteners may be made of a range of materials of durability and strength supportive of the function and durability of the resilient wheel 100 so assembled.

Figure 2A:
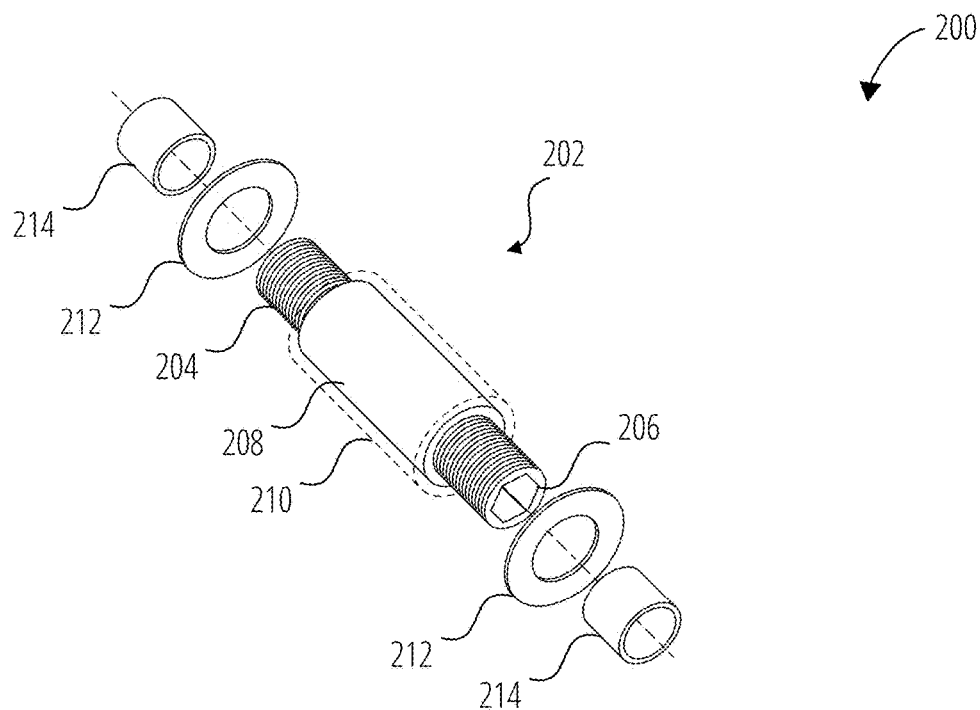
FIG. 2A-FIG. 2E illustrate resilient wheel assembly details 200 in accordance with one embodiment.

The resilient wheel 100 may comprise an axle assembly 202, shown in FIG. 2A. The axle assembly 202 may be created using a central axle 204 which in one embodiment has a grooved interior 206. The axle assembly 202 may be threaded throughout its length, may have threaded ends, or may include other features to facilitate connection and fastening of the axle assembly 202 within the resilient wheel 100. A non-interference spacer 208, in one embodiment encased in a non-interference spacer sleeve 210, may be centered on the central axle 204 with spoke band retention flanges 212 positioned to either side. In one embodiment, readily available stainless steel washers may be used as spoke band retention flange 212. In another embodiment, spoke band retention flanges 212 of various sizes appropriate to the diameters of the central axle 204 and the diverters 106 may be machined from materials of the durability needed. Axle spacers 214 may be placed at the ends of the central axle 204 in order to capture the spoke band retention flanges 212 in position and to provide displacement between the spoke band retention flanges 212 and the outer elements of the hub assembly described below.

Figure 2B:
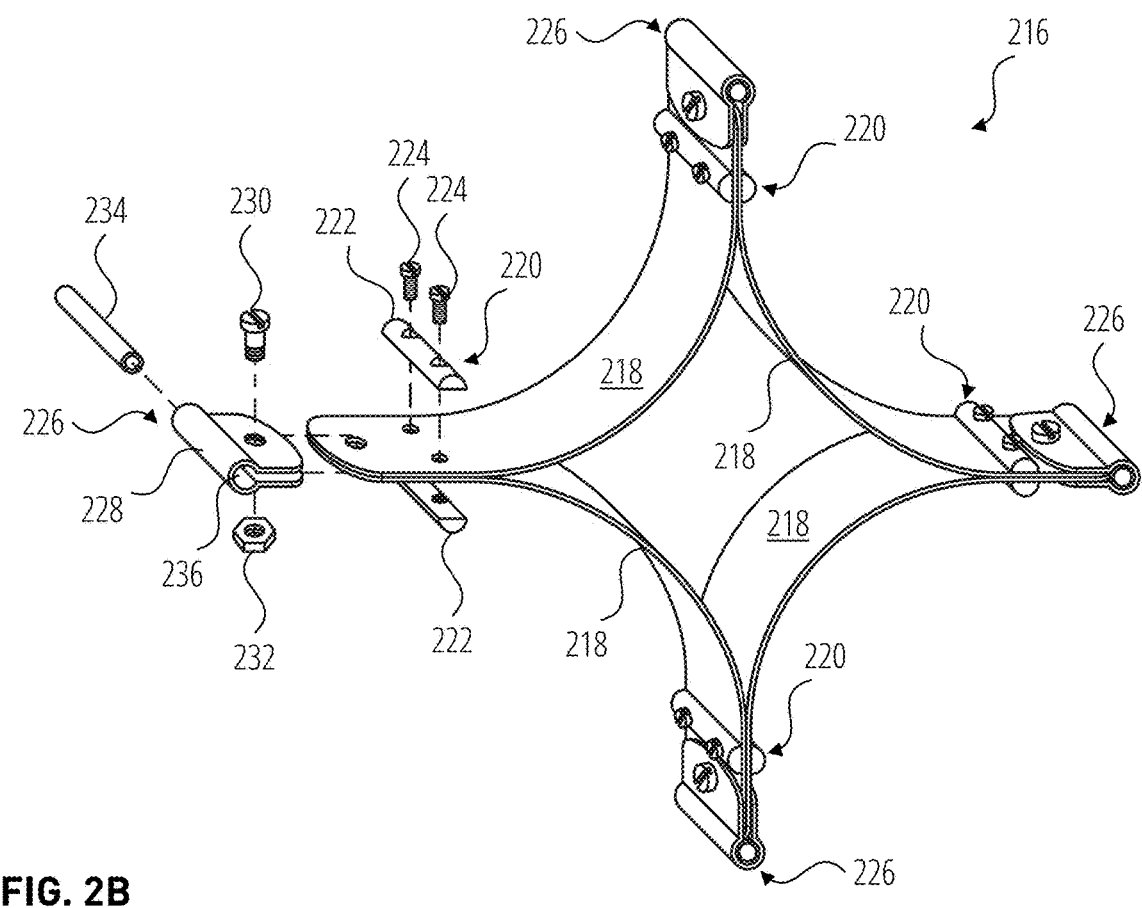

The resilient wheel 100 may further comprise a spoke band assembly 216, shown in FIG. 2B. The spoke band assembly 216 may comprise pairs of spoke bands 218 connected to form the wheel spokes 104 of the resilient wheel 100. The resilient wheel 100 of FIG. 1A-FIG. 4A comprises four wheel spokes 104 formed from four interconnected spoke bands 218, but many other embodiments are contemplated using similar components, as described below. The spoke bands 218 are conjoined into the wheel spoke 104 pairs by spoke brake assemblies 220. The spoke brake assemblies 220 each comprise two half-round spoke brakes 222 and an appropriate number of spoke brake fasteners 224. The half-round spoke brakes 222 are placed to either side of the corresponding adjoining spoke band 218 ends, and are fastened together by the spoke brake fasteners 224 which pass through aligned holes in the spoke bands 218 and half-round spoke brakes 222 as indicated. The end of each wheel spoke band may be attached to a spoke hinge assembly 226 forming a portion of the universal hinge joint 108 connecting the wheel spoke 104 to the flexible rim 110 as shown in FIG. 1A. The spoke hinge assembly 226 may include a hinge collar 228 affixed through centered holes in the ends of the spoke bands 218 by a shouldered fastener 230 secured by a shouldered fastener locking nut 232. A hinge collar sleeve 234 may be inserted into the channel of the hinge collar 228 to prevent the ends of the spoke bands 218 within the hinge collar 228 from interfering with the action of the spoke hinge assembly 226 and/or the rim hinge assembly 256 of the universal hinge joint 108. The universal hinge joint 108 so formed and its operation are shown in greater detail with respect to FIG. 8A-FIG. 9. Alternately, the hinge collar 228 and the hinge collar sleeve 234 may be manufactured as a single piece or part for the spoke hinge assembly 226.

The hinge collar 228 illustrated in FIG. 2B may be a band of material shaped into a loop forming the channel 236 with ends flattened into a parallel configuration spaced to accommodate the spoke bands 218. The hinge collar 228 may in another embodiment be formed from a completely enclosed cylinder or tube forming its channel 236 and configured with protruding flanges spaced to accommodate the spoke bands 218. In this embodiment, the universal hinge joint 108 may incorporate a hinge collar sleeve 234 to reduce friction and wear or may omit the hinge collar sleeve 234. Where the hinge collar sleeve 234 is omitted, the bore of the hinge collar 228 may loosely enclose the tension pin 264 shown in FIG. 2E. This fully enclosed channel 236 embodiment of the hinge collar 228 may be advantageous when resilient wheels having wider or thicker spoke bands are used or when enhanced strength for the spoke hinge assembly 226 is desired.

Figure 2C:
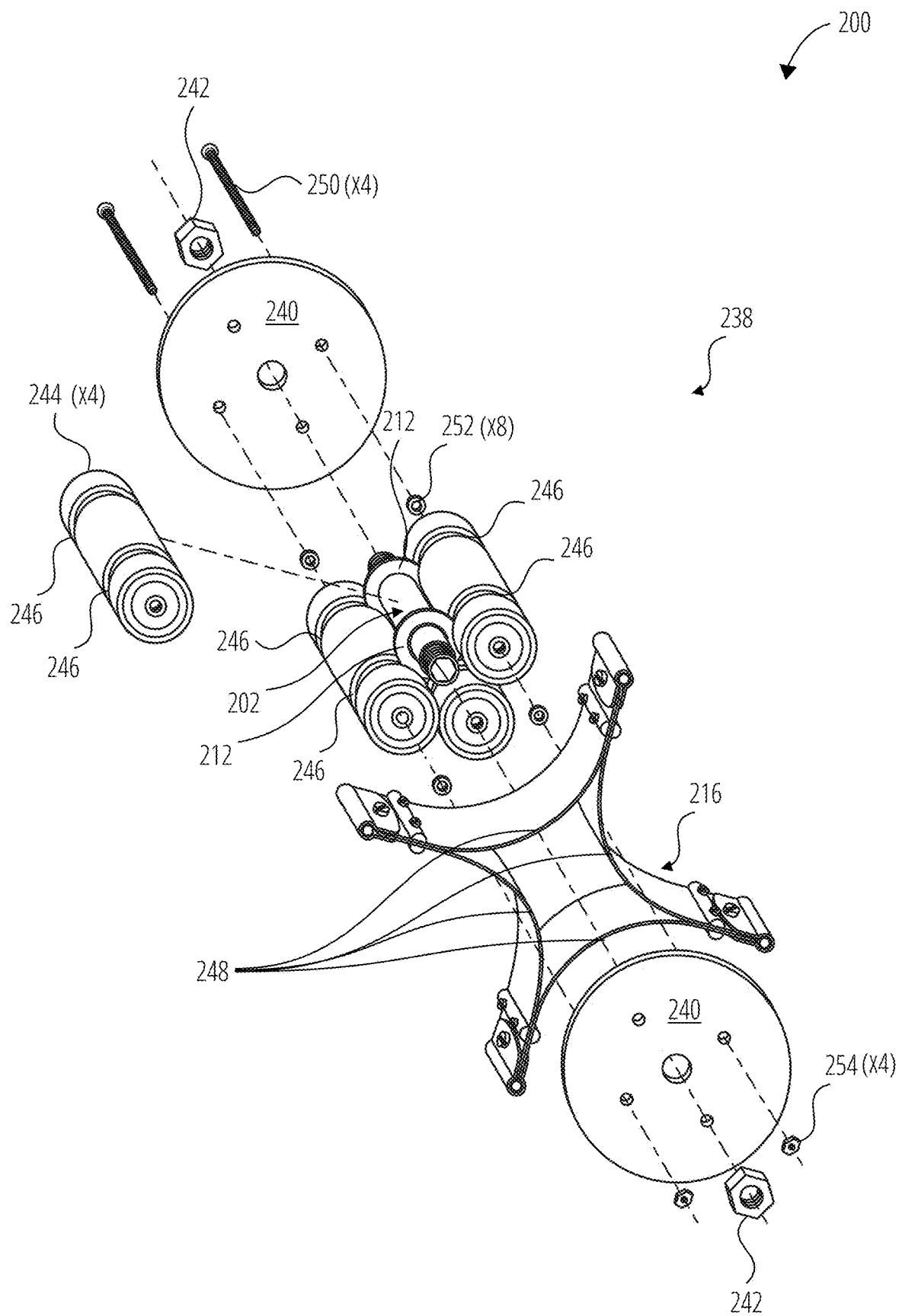

FIG. 2C illustrates resilient wheel assembly details 200 for the hub assembly 238 forming the wheel hub 102 and wheel spokes 104 of the resilient wheel 100. The hub assembly 238 may be formed by affixing one end of the axle assembly 202 to a hub assembly face plate 240 using an axle locking nut 242. The spoke band assembly 216 may be placed around the axle assembly 202, and a second hub assembly face plate 240 may be affixed to the other end of the axle assembly 202 with a second axle locking nut 242. Each single band diverter 244 of the hub assembly 238, having at least one retention flange gap 246, may then be placed at the apex 248 of its corresponding spoke band 218 with the spoke band retention flanges 212 of the axle assembly 202 inserted into the retention flange gaps 246 of the single band diverters 244. The single band diverters 244 may be secured within the hub assembly face plate 240 by sliding a diverter shaft 250 through aligned holes in the hub assembly face plate 240, a diverter spacer 252, the single band diverter 244, a second diverter spacer 252, and the second hub assembly face plate 240, and then securing the diverter shaft 250 with a diverter locking nut 254. In this manner, the hub assembly 238 may capture the spoke bands 218 of the spoke band assembly 216 between the single band diverters 244 and the axle assembly 202, retained in place by the spoke band retention flanges 212.

The single band diverters 244 may be ball bearing cylindrical rollers. They may have an exterior rubber sleeve or liner formed from heat shrink tubing, Santoprene rubber tubing stretched to fit over the outer diameter of the roller, or through similar techniques. The rollers may be flat plane rollers having a constant outer diameter along their length. The rollers may also be concave, having an outer diameter that is narrowest in the center and widens toward the ends, or convex, having an outer diameter that is widest at the center and narrows toward the ends. The rollers may thus have a groove or apex at their centers which is configured to influence the spoke bands toward the center of their diverters and away from the spoke band retention flanges, reducing wear.

Figure 2D:
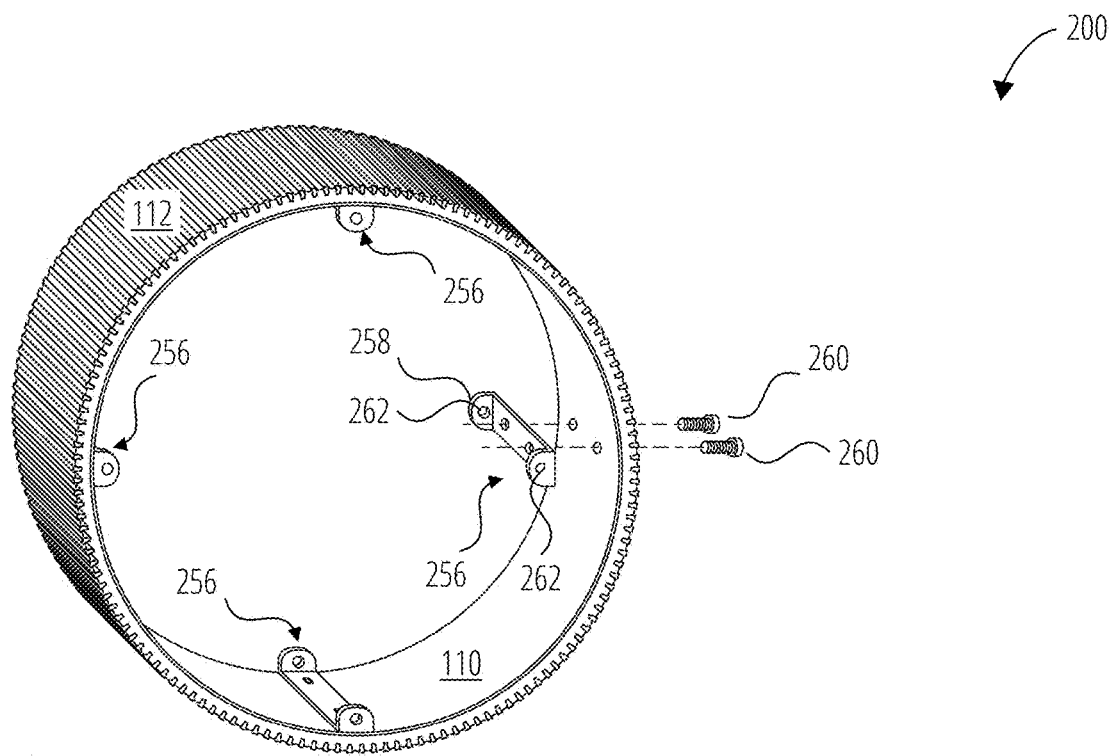

FIG. 2D shows the affixation of the rim hinge assemblies 256 to the flexible rim 110 and tire 112 of the resilient wheel 100. (The flexible rim 110 and tire 112 may be assembled through additional steps before or after the rim hinge assemblies 256 are affixed to the flexible rim 110, though processes that are well understood in the art. The rim hinge assemblies 256 each comprise a hinge housing 258 with side holes 262 to either side as shown and an appropriate number of hinge housing fasteners 260. The hinge housing fastener 260 may pass through aligned holes in the flexible rim 110, in some embodiments the tire 112, and the hinge housing 258 to fasten the hinge housings 258 to the flexible rim 110, as shown. In one embodiment, the hinge housings 258 may be fastened to the flexible rim 110, then the tire 112 may be applied and adhered to the flexible rim 110 over the hinge housing fasteners 260.

Figure 2E:
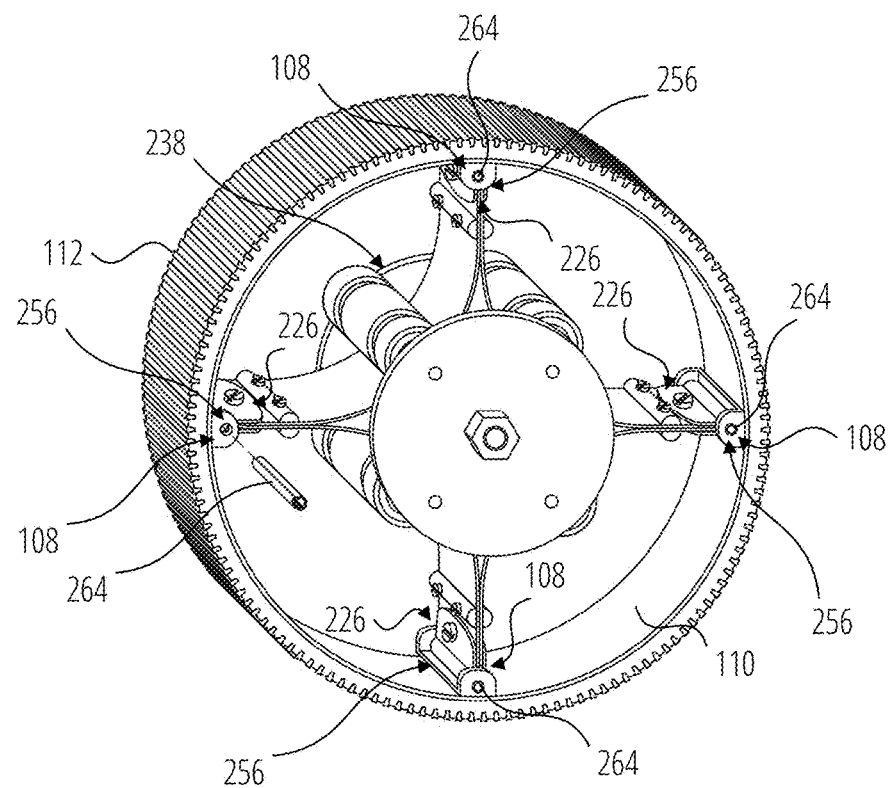

FIG. 2E shows the assembly of the hub assembly 238 with the flexible rim 110 and tire 112 to form the resilient wheel 100. The spoke hinge assemblies 226 at the end of each spoke may be secured within the rim hinge assemblies 256 by pressing a tension pin 264 through one side hole 262 of the hinge housing 258, through the channel 236 of the hinge collar 228 and the hinge collar sleeve 234, and through the other side hole 262 of the hinge housing 258. By doing so for each spoke, the hub assembly 238 may be affixed to the flexible rim 110 at the universal hinge joints 108 and the resilient wheel 100 formed.

FIG. 3A-FIG. 3C illustrate exemplary wave motion 300 in accordance with one embodiment. The resilient wheel disclosed herein travels across terrain using rotation of the central axle and wave motion. "Wave motion" refers to the linear, horizontal movement of the central axle in relationship to the flexible rim as it rotates, due to the extension and retraction of the spokes as the spoke bands are diverted across the single band diverters, and the corresponding deflection of the flexible rim. Put another way, wave motion is the linear movement or displacement of the central axle of a resilient wheel along the plane or surface of its elongated spoke in advance. As the diverters rotate with the axle, they traverse the length of their spoke bands along an angled path. This movement is in a uniform plane below and parallel to the normal plane of travel for the central axle. The principles of wave motion that underly the resilient wheels disclosed herein are illustrated in detail for a four band, four spoke wheel, but apply also to the other resilient wheel configurations and embodiments described below, as will be readily understood by one of ordinary skill in the art.

In the case of the four spoke four band resilient wheel 100, the wheel shape changes from circular to elliptical when a load is placed upon the central axle 204, as introduced in FIG. 1A and FIG. 1B and shown herein. This causes the spokes to shorten in length as they pass directly above and below the central axle 204, as may be seen with respect to the grounded spoke 302, which is spoke 104*a* in FIG. 3A, and its opposite, spoke 104*c*. The other two spokes experience a complementary increase in length by the same amount, as may be seen by the advance spoke 304, spoke 104*b* in FIG. 3A and its opposite, spoke 104*d*. This is due to the ability of the two connected spoke bands forming each one of the spokes to freely pivot and traverse across their diverters. (For the purposes of simplicity, one central axle 204 is annotated in FIG. 3A, but one of ordinary skill in the art will immediately recognize the central axle 204 of each figure.)

As the wheel rotates in the direction of motion 116, as is shown from left to right in FIG. 3A, diverter 106*b* begins to roll upon the top surface of the horizontal advance spoke 304, spoke 104*b*, in the direction of motion 116. This movement of the hub in relation to the flexible rim causes to elongated advance spoke 304 and its opposite, spoke 104*d*, to shorten and the shortened grounded spoke 302, spoke 104a, and its opposite, spoke 104c, to elongate in equal amounts. This may be seen in FIG. 3B, where spoke 104b has become the grounded spoke 302 and spoke 104c has become the advance spoke 304, with diverter 106c rolling upon its top surface. This action continues in FIG. 3C, where spoke 104c has become the shortened grounded spoke 302 and spoke 104d is the elongated advance spoke 304, with diverter 106d rolling along its top surface.

Note that the wheel hub 102 may be seen to rotate close to 90° by following the movement of diverter 106a in FIG. 3A, FIG. 3B, and FIG. 3C, in turn. At the same time, the flexible rim 110 may be seen to completes a rotation of less than 180°, but more than 90°, as may be seen by the locations where spoke 104a connects to flexible rim 110 across these three figures. This is possible because the hub travels along the advance spoke 304. The distance the resilient wheel 100 travels, less the portion of the circumference that the wheel hub 102 rotates, may be expressed as wave motion. Wave motion arises because the resilient wheel 100 has wheel spokes 104 that vary in length as they rotate. Conventional wheels, in contrast, have fixed-length spokes.

When the resilient wheel 100 is under power or momentum, a portion of that power is converted into rotation of the wheel, and a smaller portion of that power is converted into the centrifugal motion whereby the wheel hub 102 advances forward along the top surface of the advance spoke 304. Thus the resilient wheel 100 travels through both rotation and wave motion. In this manner, wave motion of a resilient wheel 100 may have a gear ratio effect in that a degree of rotation of the hub may impart a greater than equal degree of rotation at the rim. This may impart a longer life of the resilient wheel 100 in comparison with conventional wheels.

FIG. 3A-FIG. 3C also illustrate the ability of the resilient wheel 100 to traverse over a low obstruction 306 with a smooth and gentle horizontal displacement, in contrast to the abrupt displacement experienced by conventional wheels. As is shown by the dotted line, the hub displacement 308, or the horizontal distance between the central axle 204 and the grounded portion of the resilient wheel 100, may, through the rotation and wave motion of the resilient wheel 100, remain fairly steady and experience no abrupt changes from its condition over flat terrain (FIG. 3B) as the resilient wheel 100 comes down from (FIG. 3A) or surmounts (FIG. 3C) a low obstruction 306.

FIG. 4A-FIG. 4C illustrate exemplary wave motion 400 in accordance with one embodiment. In addition to the characteristics of exemplary wave motion 300 illustrated in FIG. 3A-FIG. 3C (i.e., the complementary shortening and elongating of spokes 104a-104d as the resilient wheel 100 rotates in a direction of motion 116 and the spokes transition from being the advance spoke 304 to being the grounded spoke 302), FIG. 4A-FIG. 4C illustrate the horizontal hub displacement 404 of the central axle 204 as the resilient wheel 100 traverses a high obstruction 402. (Again, for the purposes of simplicity, one central axle 204 is annotated in FIG. 4A, but one of ordinary skill in the art will immediately recognize the central axle 204 of each figure.)

FIG. 4A shows the resilient wheel 100 approaching the high obstruction 402. Spoke 104a is the grounded spoke 302 in this position and spoke 104b is the advance spoke 304. As spoke 104b contacts the high obstruction 402 in FIG. 4B, it becomes the grounded spoke 302 and shortens. As the wheel continues to rotate in the direction of motion 116, the wave motion of the resilient wheel 100 allows the central axle 204 to transition upward gradually, rather than the abrupt and jarring transition or even inability to continue forward experienced by a conventional wheel, as shown by the dotted line tracking hub displacement 404. As may be seen in FIG. 4C, the resilient wheel 100 may, because of its rim and wave motion, surmount the high obstruction 402 readily while experiencing a gradual change in hub displacement 404.

FIG. 5A and FIG. 5B illustrate a single retention flange hub assembly detail 500 in accordance with one embodiment. FIG. 5A shows an exploded view of the elements of the assembly. FIG. 5B illustrates a front elevation view of the assembled elements of the assembly. A hub assembly with a single retention flange may be assembled substantially as described with respect to the hub assembly 238 having two spoke band retention flanges 212 illustrated in and described with respect to FIG. 2C.

As may be seen in the single retention flange hub assembly detail 500, however, this assembly may comprise a single spoke band retention flange 212 centered on a central axle 204 with two non-interference spacers 502 disposed to either side of the spoke band retention flange 212. The single spoke band retention flange 212 may extend through a retention flange slit 510 in a spoke band 508 and into a single retention flange gap 506 configured within the diverter 504.

In this configuration, a single spoke band retention flange 212 may be used to align each of the spoke bands 508 to a central plane of motion normal to the central axle 204 across their diverters 504.

FIG. 6 illustrates a front elevation double retention flange hub assembly detail 600 in accordance with one embodiment. The assembly of a double retention flange hub is described and illustrated with respect to FIG. 2C. The double retention flange hub assembly detail 600 is shown in contrast to the single retention flange hub assembly detail 500 of FIG. 5B to clearly illustrate the differences of the two configurations. In both cases the spoke band retention flanges 212 are configured to restrict the spoke bands of the respective hub assemblies to a single central plane of motion normal to the central axle 204.

In both the single retention flange hub assembly detail 500 and double retention flange hub assembly detail 600, as shown by FIG. 5B and FIG. 6, it may be immediately seen that the protrusion of the spoke band retention flange 212 or spoke band retention flanges 212 either through a single retention flange gap 506 in a spoke band 508 or to either side of a spoke band 218 and into the single retention flange gaps 506 of the diverters 504 or the retention flange gaps 246 of the single band diverters 244 limits the motion of the spoke bands 508 and spoke bands 218, respectively, in the x-dimension, as the wheel travels in the z-dimension by rotating in the y-z plane.

This prevents the spoke bands 508 and spoke bands 218 from slipping sideways out of alignment with their diverters 504/single band diverters 244, improving efficiency of action and reducing wear. Further, this novel hub aligns the spoke bands 218 and spoke bands 508 into the shape of a concentric, central axle wheel. The spokes are united into one central plane normal to the axle. The spokes do not rotate within separate axes for each pulley (pivot) of the hub, which may result in excessive drift or drag of the combined parts. This may have the effect of friction within the hub due to spoke misalignment with the central axle. In this manner, the spoke band 218 of both the single retention flange hub assembly detail 500 and double retention flange hub assembly detail 600 improve the alignment and thus the efficiency of motion of their respective resilient wheels while reducing wear.

FIG. 7A-FIG. 7H illustrate diverter rollers 700 in accordance with various embodiments. In one embodiment, the diverters used in the disclosed wheels may be ball bearing cylindrical rollers 702. These may have retention flange gaps 246 as introduced with respect to FIG. 2C. The diverters may be flat plane rollers In one embodiment, the diverters may be rollers with spoke band retention flanges 710, which may act as the spoke band retention flanges 212 constraining the spoke bands in place of those on the central axle as previously described. The central axle may be narrower than the span of the spoke band retention flange 212 of rollers with spoke band retention flanges 710, or may incorporate retention flange gaps 246 similar to those described for the diverters 106 previously described. In one embodiment, the diverters may be narrow rollers 712 capable of fitting within the span of the spoke band retention flanges 212 of the central axle 204 or rollers with spoke band retention flanges 710. In one embodiment, the diverters may be rollers with an exterior rubber sleeves 714, such as the exterior rubber sleeve 716 shown.

In one embodiment, the diverters may be concave rollers 718 having an outer diameter that is narrowest 720 in a center 722 and widens 724 toward ends 726 of the concave rollers 718. In one embodiment, the diverters may be convex rollers 728, having an outer diameter that is widest 730 at the center 722 and narrows 732 toward the ends 726 of the convex roller 728. In one embodiment, the diverters may be rollers with a groove or apex 734 at the center 722 configured to influence the spoke bands toward the center 722 of the diverters and away from at least one spoke band retention flange. A roller with a groove 736 is shown with a wide groove 738. A roller with an apex 740 is shown with an apex 742.

Figure 8A:
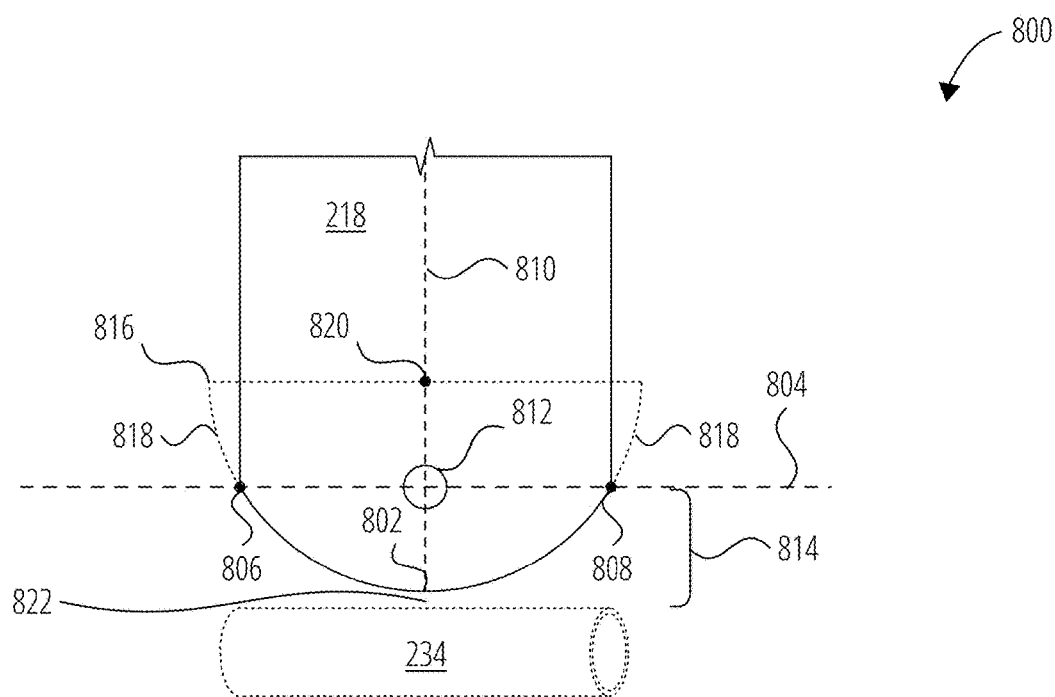
FIG. 8A and FIG. 8B illustrate universal hinge joint configuration 800 in accordance with one embodiment.
Figure 8B:
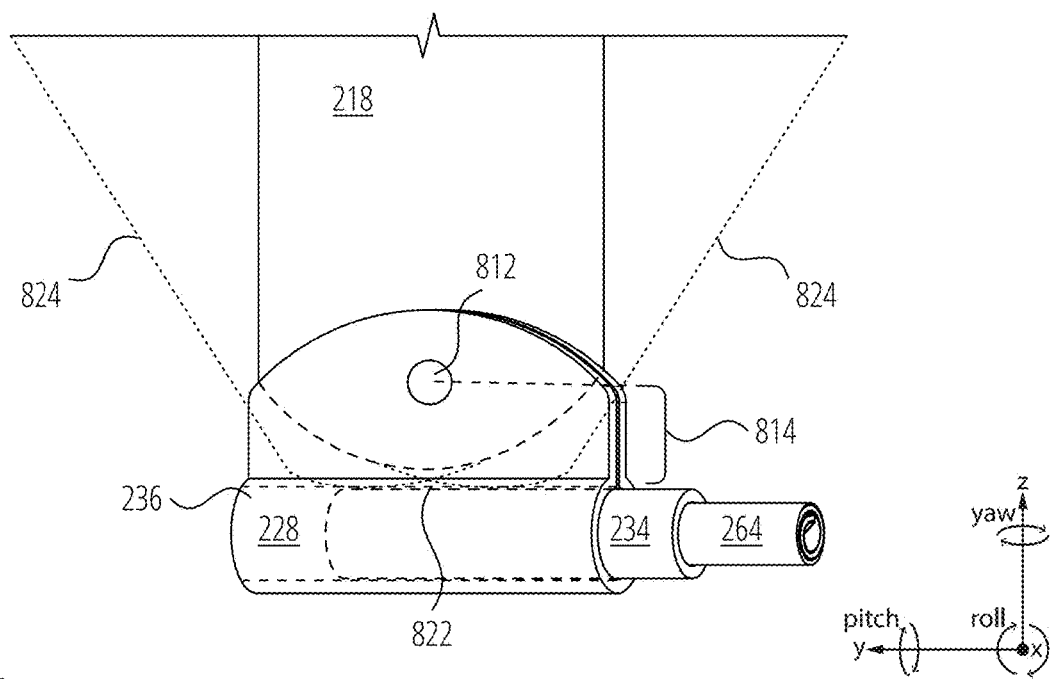

FIG. 8A and FIG. 8B illustrate universal hinge joint configuration 800 in accordance with one embodiment. The universal hinge joint, such as the universal hinge joint 108 previously introduced, may be configured as described below to support the controlled flexibility of motion in multiple directions that allow the universal hinge joint to improve conformation of the disclosed wheel to underlying uneven terrain.

A spoke band 218 may be configured with a curved end 802 as shown in FIG. 8A. Plane 804, normal to the length of the spoke band 218, designates the location along the length of the spoke band 218 at which the end curvature begins. Point 806 and point 808 designate the points at which plane 804 intersects the edges of the spoke band 218. A spoke band midline 810 bisecting the spoke band 218 along its length is also indicated.

The axis hole 812 for the shouldered fastener of the universal hinge joint may be provided at the intersection of plane 804 with the spoke band midline 810. The distance from the center of the axis hole 812 to the edge of the hinge collar sleeve 234 when the universal hinge joint is assembled represents the radius of curvature 814 upon which the spoke band 218 may rotate within the hinge collar 228 when the universal hinge joint is assembled. One may also think of this as the radius of curvature 814 upon which the hinge collar 228 and hinge housing previously described may rotate with respect to the spoke band 218.

The radius of curvature 814 is configured to be less than one-half the width of the spoke band 218 (i.e., less than the distance from the center of axis hole 812 to point 806 or point 808). This yields a spoke band 218 having a curved end 802 that is a low profile arc of a larger circle. Half of the larger circle 816 is shown, formed from the curved end 802 in conjunction with two arcs 818 which extend the curved end 802 curvature from points 806 and 808 up to the center point 820 of this larger circle along the spoke band midline 810. This larger circle, of which half of the larger circle 816 is shown, may be configured in size to establish the curved end 802 of the spoke band 218 such that there is a shorter distance from the axis hole 812 to the apex of the curved end 802 than the radius of curvature 814. Thus, when the universal hinge joint is assembled, the curved end 802 of the spoke band 218 may be separated from the hinge collar sleeve 234 by a gap 822.

As shown in FIG. 8B, this gap 822, in conjunction with the radius of curvature 814, establishes the range of motion possible for the spoke band 218 within the hinge collar 228 (or the range of motion of the hinge collar 228 with respect to the spoke band 218). The gap 822 allows the spoke band 218 to rotate to either side of the hinge collar 228 until it comes to a stop at a maximum point of rotation 824, where the curved end 802 of the spoke band 218 abuts against the hinge collar sleeve 234.

In an embodiment where the hinge collar 228 is formed from a fully enclosed channel 236 configured with parallel protruding flanges, as previously described, the curved ends 802 of the spoke bands 218 do not protrude into the channel 236 of the hinge collar 228 under rotation to abut the hinge collar sleeve 234, as shown here. Rather, the gap 822 may be configured between the curved ends 802 and the outer diameter of the fully enclosed channel 236 where it forms the linear bottom of the slot between the parallel protruding flanges. Under rotation, the curved ends 802 may thus abut the linear bottom of the slot, which may limit the degree of rotation possible for the curved ends 802 within the hinge collar 228.

FIG. 9 illustrates universal hinge joint motion 900 in accordance with one embodiment. Universal hinge joint motion 900 may be accomplished by the universal hinge joint 108 introduced with respect to FIG. 1A, which may attach the spoke band assembly 216 to the flexible rim 110, and which may comprise the hinge collar 228, the shouldered fastener 230, the shouldered fastener locking nut 232 (not visible in FIG. 9), the hinge collar sleeve 234, the hinge housing 258 and its fasteners (not visible in FIG. 9) and the tension pin 264, assembled as described with respect to FIG. 2A-FIG. 2E.

In one embodiment, the curved ends 802 of two spoke bands 218 may be brought together within the hinge collar 228 and moveably secured within the hinge collar 228 by the shouldered fastener 230 and shouldered fastener locking nut 232. The shouldered fastener 230 may allow the conjoined spoke bands 218 to rotate with respect to the hinge collar 228 in a roll rotation 902 motion as shown. The hinge collar 228 may be sized such that it provides as low a profile as possible when attached to the rim of the resilient wheel, allowing the spoke bands to retract as much as possible during the wheel's rotation through wave motion. This may be accomplished in part by configuring the curved ends 802 of the spoke bands 218 as an arc of a circle having a radius of curvature greater than or equal to one-half the width of the spoke band.

The alignment of the shouldered fastener 230 may be positioned as described with respect to FIG. 8A and FIG. 8B. When the curved ends 802 of the spoke bands 218 collide with the hinge collar sleeve 234 in either direction of rotation, the spoke comes to a non-jamming stop in that direction, limiting the roll rotation 902. The curvature of the curved ends 802 may also limit the degree of roll rotation 902 such that buckling of the spoke formed by the spoke bands 218 in the roll rotation 902 direction is prevented, as previously described.

The hinge collar 228 may be secured within the hinge housing 258 by the tension pin 264 as previously described. The hinge collar 228 may rotate within the hinge housing 258 around the axle formed by the tension pin 264, in a pitch rotation 904 motion. The flexibility of the spoke band assembly 216 and the flexible rim 110, as well as the geometry of the hub assembly as previously illustrated, may limit the pitch rotation 904 of the spoke bands 218 with respect to the flexible rim 110 such that buckling of the spoke formed is prevented in the direction of the pitch rotation 904 as well. In this manner, a sturdy resilient wheel may be developed having spokes attached to the flexible rim 110 by universal hinge joints 108 which allow the wheel geometry to adapt to uneven terrain while maintaining the structural integrity and supporting the rotational motion of the resilient wheel.

The universal hinge joint 108 formed from these components may, when connected to the flexible rim 110, take on a plumb position with respect to the inner surface of the flexible rim 110. It may return to this plumb position with respect to the flexible rim 110 and the wheel itself when displaced. When the universal hinge joint 108 rolls sideways due to some motion of the spoke band assembly 216, it may twist the flexible rim 110. However, the flexible rim 110 may have a 100% memory of its desired shape and may spring back to this shape. This connection makes the universal hinge joint 108 itself spring-loaded and self-righting to its desired plumb position.

While the universal hinge joint motion 900 is illustrated here with a spoke formed by two spoke bands 218, one of ordinary skill in the art will appreciate that a spoke formed by a single spoke band 218, as shown for embodiments illustrated below, may also attach to the flexible rim 110 through a universal hinge joint 108 permitting and supporting the universal hinge joint motion 900 described here.

Figure 10:
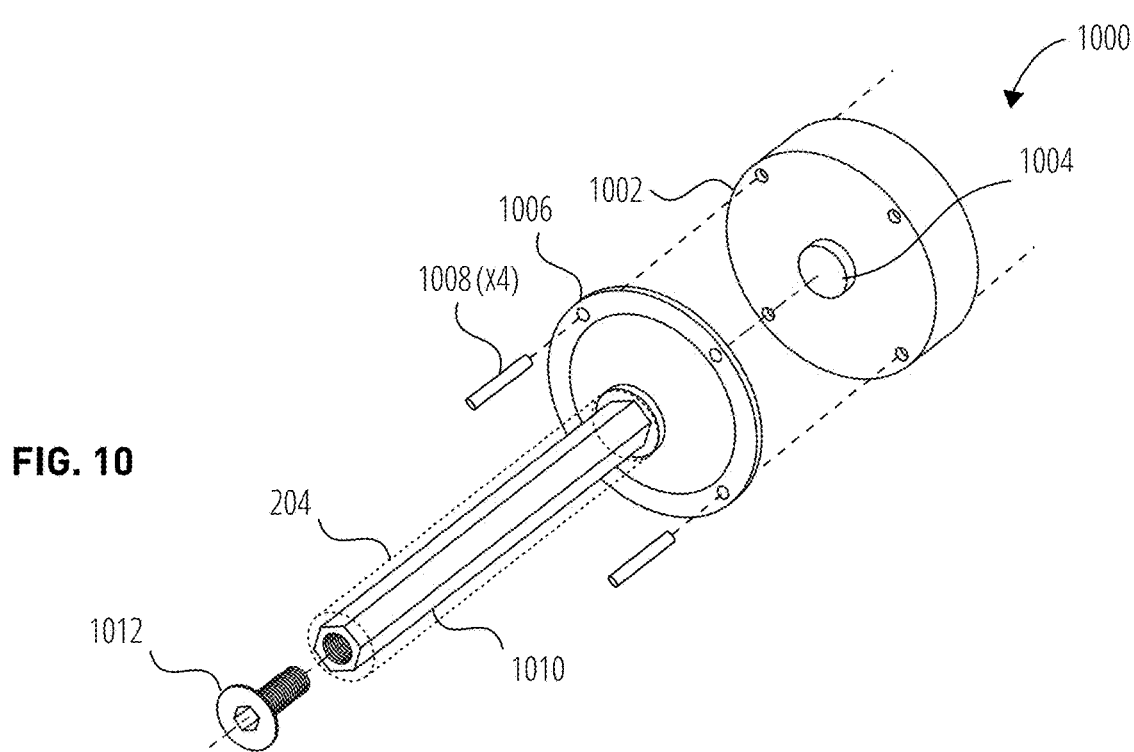
FIG. 10 illustrates an adapter assembly 1000 in accordance with one embodiment.

FIG. 10 illustrates an adapter assembly 1000 in accordance with one embodiment. The adapter assembly 1000 may be used to attach the resilient wheel disclosed herein to the face of a standard brake drum 1002 of a vehicle. If the resilient wheel either rotates freely or is powered through a drive-line axle, then no adapter-plate may be needed to function.

The adapter assembly 1000 may have a flanged end adapter 1006 configured to attach to the standard brake drum 1002. The flanged end adapter 1006 may incorporate a centered, recessed dome in order to not interfere with the capped bearing end of the drive-line axle 1004. Adapter fasteners 1008 may attach the flanged end adapter 1006 of the adapter assembly 1000 to the standard brake drum 1002. Four adapter fasteners 1008 are shown in the illustrated embodiment, but any number adequate to provide secure attachment may be used. The adapter fasteners 1008 may be threaded fasteners such as screws or bolts secured by nuts.

At the center of the flanged end adapter 1006, opposite the dome for accepting the capped bearing end of the drive-line axle 1004, the adapter assembly 1000 may have an exterior grooved spline 1010 that extends outward. The grooved spline 1010 may be configured to be received by a grooved interior 206 of the central axle 204 introduced with respect to FIG. 2A. In exemplary embodiments, the grooved spline 1010 (rod or tubing) may be machined from steel to form a grooved exterior to match the grooved interior 206 orifice-opening of the central axle 204 of a resilient wheel hub assembly 238. The grooved spline 1010 may be fitted onto the dome housing of the flanged end adapter 1006 and may be welded in place. In one embodiment, the grooved spline 1010 may be an elongated coupling nut (with adjoining fasteners) that is welded onto the dome housing.

The grooved spline 1010 may include interior threading. The resilient wheel may thus be secured to the grooved spline 1010 of the adapter assembly 1000 by a flanged fastener 1012 such as the one shown. The flanged fastener 1012 may be a flanged bolt used in conjunction with a lock or wave washer (not visible in FIG. 10) to lock it into place. The threaded end of the grooved spline may also include exterior threading and an orifice allowing the wheel to be secured on the adapter assembly 1000 using a castle nut and cotter pin to secure the wheel onto the adapter assembly 1000.

Figure 11A:
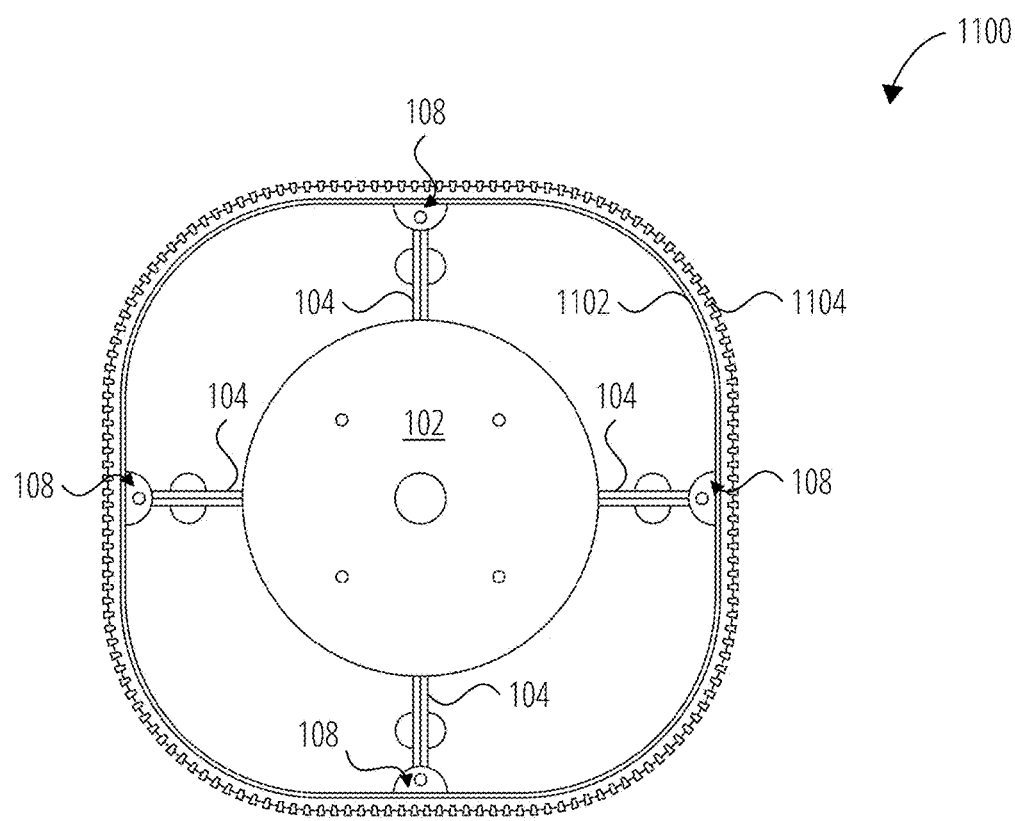
FIG. 11A and FIG. 11B illustrate a resilient wheel 1100 in accordance with one embodiment.
Figure 11B:
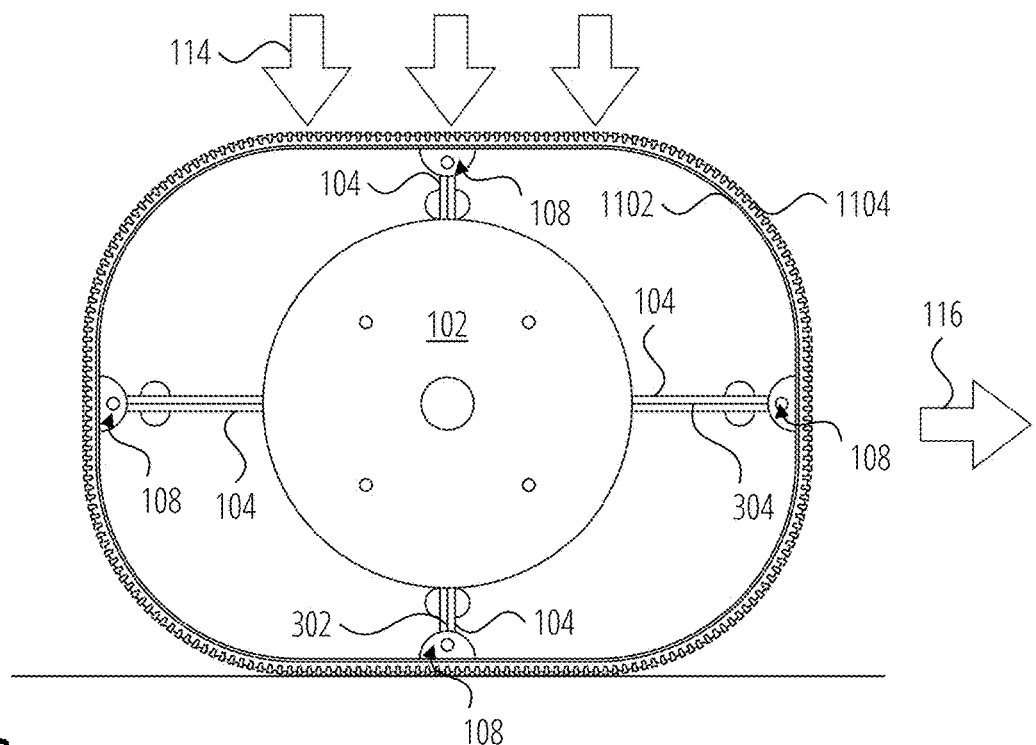

FIG. 11A and FIG. 11B illustrate a resilient wheel 1100 in accordance with one embodiment. The resilient wheel 1100 may be configured substantially as described for the resilient wheel 100 with four wheel spokes 104 radiating from a wheel hub 102 and attached by universal hinge joints 108 to a rim and tire. The resilient wheel 1100 in this embodiment may comprise an extended flexible rim 1102 and extended tire 1104, taking the shape of a rounded square when under no loading forces 114, as shown in FIG. 11A.

With loading forces 114 applied, as shown in FIG. 11B, the extended flexible rim 1102 and extended tire 1104 allow for a broader area of contact with the ground, or may, when an obstacle is encountered, allow for a more distributed area of contact with and around the obstacle, improving traction and stability, as will be well understood by one of ordinary skill in the art.

Figure 12A:
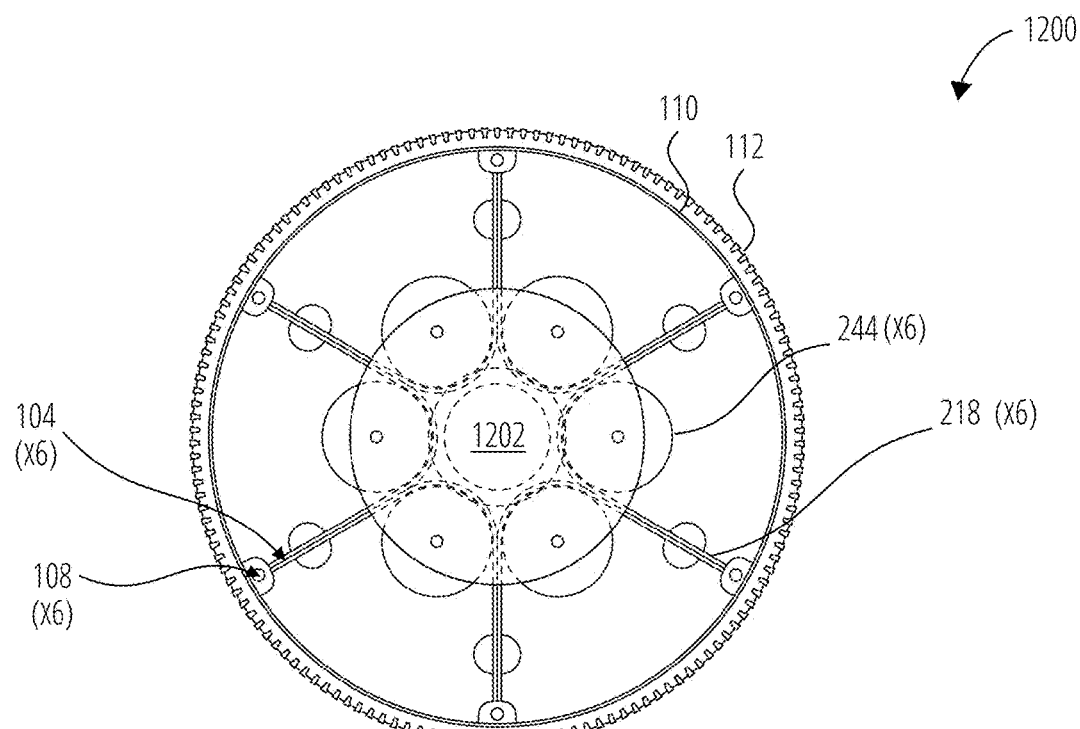
FIG. 12A and FIG. 12B illustrate a resilient wheel 1200 in accordance with one embodiment.
Figure 12B:
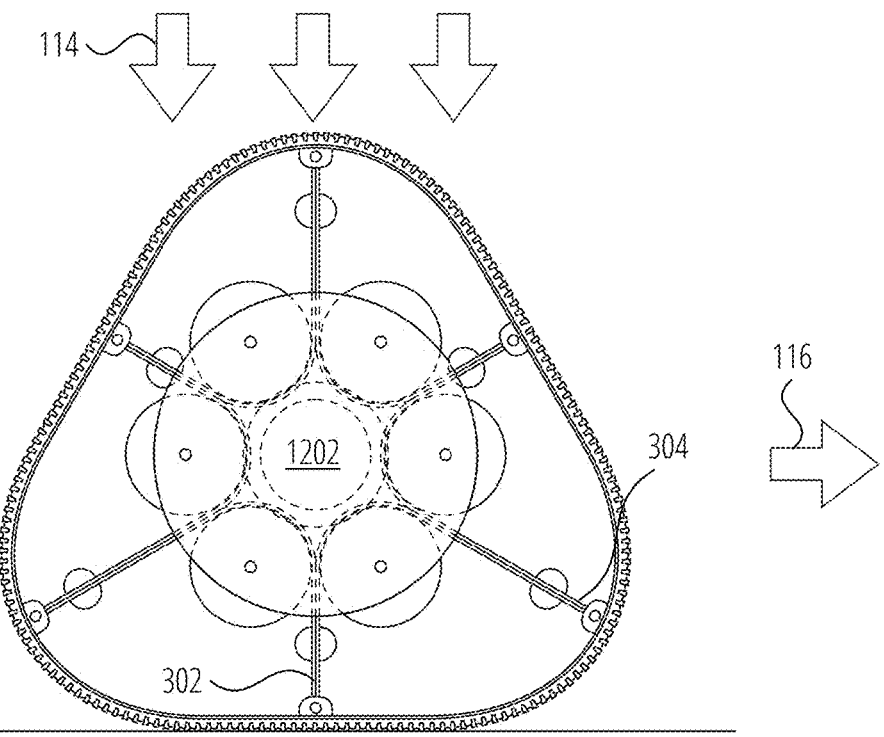

FIG. 12A and FIG. 12B illustrate a resilient wheel 1200 in accordance with one embodiment. In this embodiment, the resilient wheel 1200 may be configured from the wheel spokes 104, universal hinge joints 108, flexible rim 110, and tire 112 introduced with respect to the resilient wheel 100 and described previously. The resilient wheel 1200 may, however, have six wheel spokes 104 formed from six spoke bands 218 which each pivot around one of six single band diverters 244 in the wheel hub 1202, and which connect to the flexible rim 110 through six universal hinge joints 108, as shown in FIG. 12A.

The six-spoke resilient wheel 1200 may operate with wave motion in a similar fashion as that of the four-spoke resilient wheel 100 already illustrated. When rotating in a direction of motion 116 with loading forces 114 applied, as shown in FIG. 12B, the wheel hub 1202 of the resilient wheel 1200 rolls along a set of three elongated alternate wheel spokes 104 as they become shorter, and the other three shorter alternate wheel spokes 104 of the wheel become elongated, as shown by the grounded spoke 302 and the advance spoke 304.

In this configuration, the grounded spoke 302 and the two elongated spokes adjacent to it, including the advance spoke 304, may form a set of three adjacent spokes that terminate in universal hinge joints 108 along a straight line at the flexible rim 110, placing a broad footprint of the tire 112 in connection with the terrain. In this manner, the six-band configuration of the resilient wheel 1200 may more reliably and stably traverse fissures in the terrain.

Figure 13:
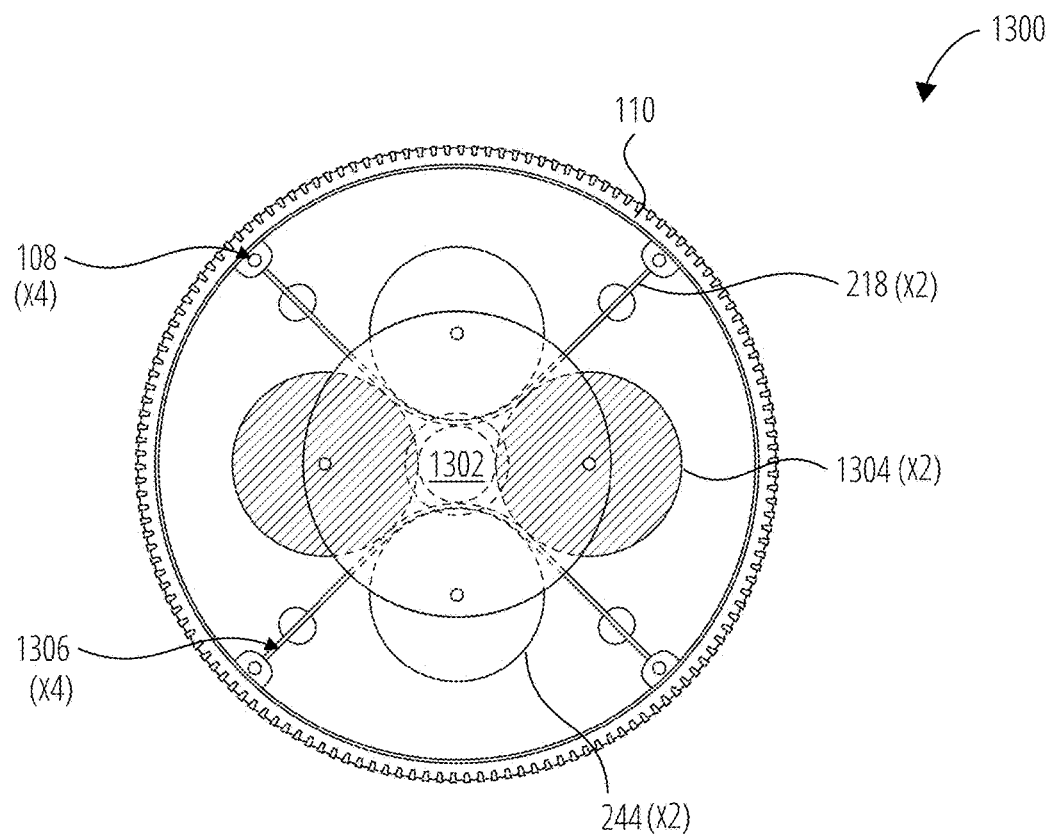
FIG. 13 illustrates a resilient wheel 1300 in accordance with one embodiment.

FIG. 13 illustrates a resilient wheel 1300 in accordance with one embodiment. The resilient wheel 1300 may include a wheel hub 1302 formed from two spoke bands 218 pivoting around two single band diverters 244 and further contained by and their motion diverted toward the flexible rim 110 by two dual band diverters 1304 to form four single-band spokes 1306, attached to the flexible rim 110 through four universal hinge joints 108, as shown.

The single band structure for the resilient wheel 1300 may accomplish the same benefits as the dual band embodiments described above, including motion through rotation and wave motion due to variable length single-band spokes 1306 which may allow the wheel to conform into several shapes under loading forces depending on the number of spokes with which the wheel is configured. Single band spoke configurations may include two types of pivotal rollers within the wheel hub 1302: single band diverters 244 which are in rotational contact with a single spoke band 218 and across which that single spoke band 218 pivots, and dual band diverters 1304 which are in rotational contact with two spoke bands and which align the single-band spokes 1306 formed from those two spoke bands 218 in two independent directions of motion.

The first of these directions of alignments may redirect the spoke back to an equidistant location along the flexible rim 110. The second direction of alignment may utilize the spoke band retention flanges introduced in FIG. 2A to bring adjacent spoke bands into a common plane of motion within the wheel hub 1302. The dual band diverters 1304 may rotate in the same direction with the two adjacent spoke bands as each band travels in opposite directions. Further, the dual band diverters 1304 may act as gussets that enhance the strength of the spoke bands. The spoke bands in turn may act as I-beams within the wheel hub 1302, and in this manner the spokes may be fortified against transverse forces placed upon the resilient wheel 1300.

In this manner, the two adjacent single band spokes, while not directly coupled as are the bands forming the spokes of the resilient wheel 100 and similar embodiments above, may be aligned by their mutual dual band diverter 1304 and coupled through their connections to the flexible rim 110, and may thus extend and retract in unison as the wheel rotates, as is accomplished by previously-described embodiments. The dual band diverters 1304 may have an outer layer of rubber or similar material that improves their ability to maintain positive contact with their spoke bands.

Each dual band diverter 1304 may roll under tension along the outer surfaces of the two spoke bands 218 it is in contact with. It may act as a directional roller, directing the two spoke bands 218 back and forth to their equidistant points of attachment to the flexible rim 110, linking both points, under tension in rotation to form two adjacent single-band spokes 1306. In this manner, and in conjunction with the single band diverters 244, each in contact with one of the spoke bands 218, which pivots across it as previously described, the wheel hub 1302 of the resilient wheel 1300 may control the movement of all four single-band spokes 1306 of the resilient wheel 1300, which all respond in unison to the loading forces 114 and forward motion in the direction of motion 116, with rotational motion and wave motion, as described for previous embodiments.

In one embodiment, the dual band diverters 1304 may include grooves as described with respect to the retention flange gaps 246 of the single band diverters 244, preventing interference of the spoke band retention flanges 212 with the dual band diverters 1304. In another embodiment, the dual band diverters 1304 may be of a shorter length than the single band diverters 244 and centrally disposed between the hub assembly face plates 240, such that they are able to fit completely within the space between the spoke band retention flanges 212. In one embodiment, the dual band diverters 1304 may include the retention flange gaps 246, and the single band diverters 244 may be narrow enough to fit completely within the space between the spoke band retention flanges 212. In one embodiment, the dual band diverters 1304 may incorporate the spoke band retention flanges, which may then be omitted in the central axle while similarly passing into retention flange gaps in the single band diverters, limiting the spoke bands within a plane of motion parallel to the direction of travel. Because one dual band diverter 1304 may in this manner confine two spoke bands 218 to the same plane of motion, this may represent an improvement over solutions where the retention flanges are incorporated into single band diverters, each directing a single spoke band, in contrast to the two bands directed by each dual band diverter. In one embodiment, the single band diverters may omit gaps to accommodate the retention flanges on the dual band diverters 1304, but may instead be narrow enough to fit within the space between the flanges. In one embodiment, the hub assembly face plates 240 may operate as retention flanges, maintaining the alignment of the spoke bands 218 within the hub assembly.

Once a number of spokes has been selected (in the resilient wheel 1300 there are four, but other configurations are anticipated, some of which are illustrated in FIG. 14-FIG. 18), and the size of the flexible rim 110 has been determined, the single band diverters 244 and dual band diverters 1304 may be sized and configured such that each end of each spoke bands may be disposed equidistantly around the circumference of the rim. The single band diverters 244 and dual band diverters 1304 may be of comparable size, as shown for the resilient wheel 1300 of FIG. 13 and the resilient wheel 1400 of FIG. 14. If a smaller hub size is desired than is supported by comparable sizing, the dual band diverters 1304 may be sized smaller than the single band diverters 244.

Where the single band diverters are selected to be the same size as the dual band diverters, they may be arranged in a single concentric ring within the hub, with gaps left between for the passage of the width of a spoke band between each diverter. The dimensions of this ring may determine the size of the hub. Where the single band diverters are selected to be larger than the dual band diverters, the diameters of the single band diverters may be summed with small gaps as before, and the diameters of the dual band diverters may be similarly summed with the appropriate number of small gaps. These two summations may be added together to form approximately the circumference of an inner concentric ring upon which the centers of the single band diverters may be located and evenly spaced. The radius of this inner ring may be calculated by dividing by $2\pi$.

In a linear fashion, the radius of one single band diverter and one dual band diverter may be added together with the radius of the inner circle to determine the approximate radius of an outer concentric ring within the hub, upon which the centers of the dual band diverters may be located and evenly spaced. The location of each dual band diverter may be arranged to be equally spaced between each single band diverter, allowing for passage of the spoke bands. The single ring or dual rings may retain the spoke bands in place and oscillating as intended, and allow the single band spokes to radiate from the wheel hub 1302 freely and pivot upon the rim in a normal and equidistant manner.

In particular, in embodiments where the number and size of evenly spaced, concentric, single band diverters is first known, then the dual band diverters may lie along a midline plane projecting from the center of the hub and equidistant between each pair of adjacent single band diverters of the hub. Their location along this plane may be determined by their diameter size. In embodiments where the dual band diverters are the same size as the single band diverters, the dual band diverters may lie along the same concentric ring of the hub, equidistant between pairs of single band diverters.

In embodiments where the dual band diverters are of a different size than the single band diverters, two concentric rings of circular diverters may be formed within the hub. The radius of the second ring may be established by the diameter size of the dual band diverters. The second ring location may be configured such that the dual band diverters may press against two adjacent spokes within the hub, as these spokes encompass the two adjacent single band diverters and proceed to equidistant hinge locations along the rim. The dual band diverters may be equidistant between each pair of single band diverters.

Figure 14:
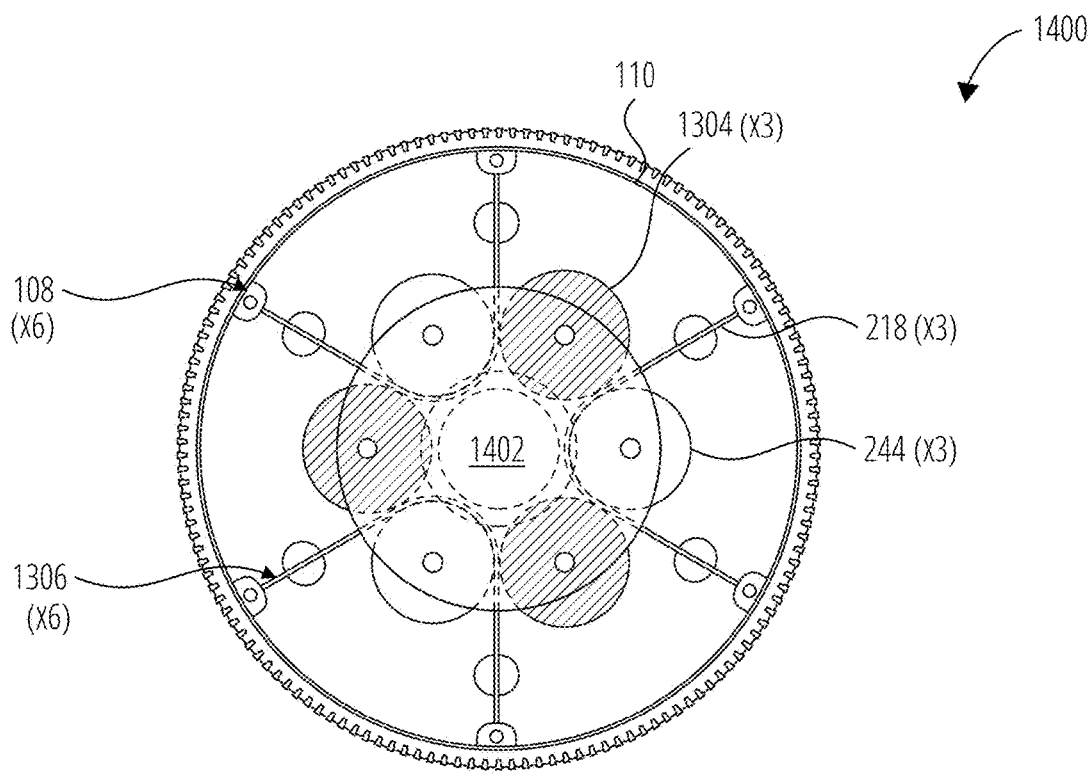
FIG. 14 illustrates a resilient wheel 1400 in accordance with one embodiment.

FIG. 14 illustrates a resilient wheel 1400 in accordance with one embodiment. The resilient wheel 1400 may include a wheel hub 1402 formed from three spoke bands 218 pivoting around three single band diverters 244 and further contained by and their motion diverted toward the flexible rim 110 by three dual band diverters 1304 to form six single-band spokes 1306, similar to the configuration described with respect to FIG. 13.

In particular, the resilient wheel 1400 may engage the terrain typically through three pairs of single-band spokes 1306 each formed by one of two ends of a single spoke band 218. The resilient wheel 1400 may contact the terrain with one centered spoke receding due to the loading forces bearing upon the wheel, as shown for the resilient wheel 1200 of FIG. 12B. The two adjacent spokes may then elongate and engage the terrain through their configuration within the wheel hub 1402 and attachment to the flexible rim 110 via universal hinge joints 108. As the resilient wheel 1400 rotates, this engagement repeats for the next set of three spokes of the wheel.

Figure 15:
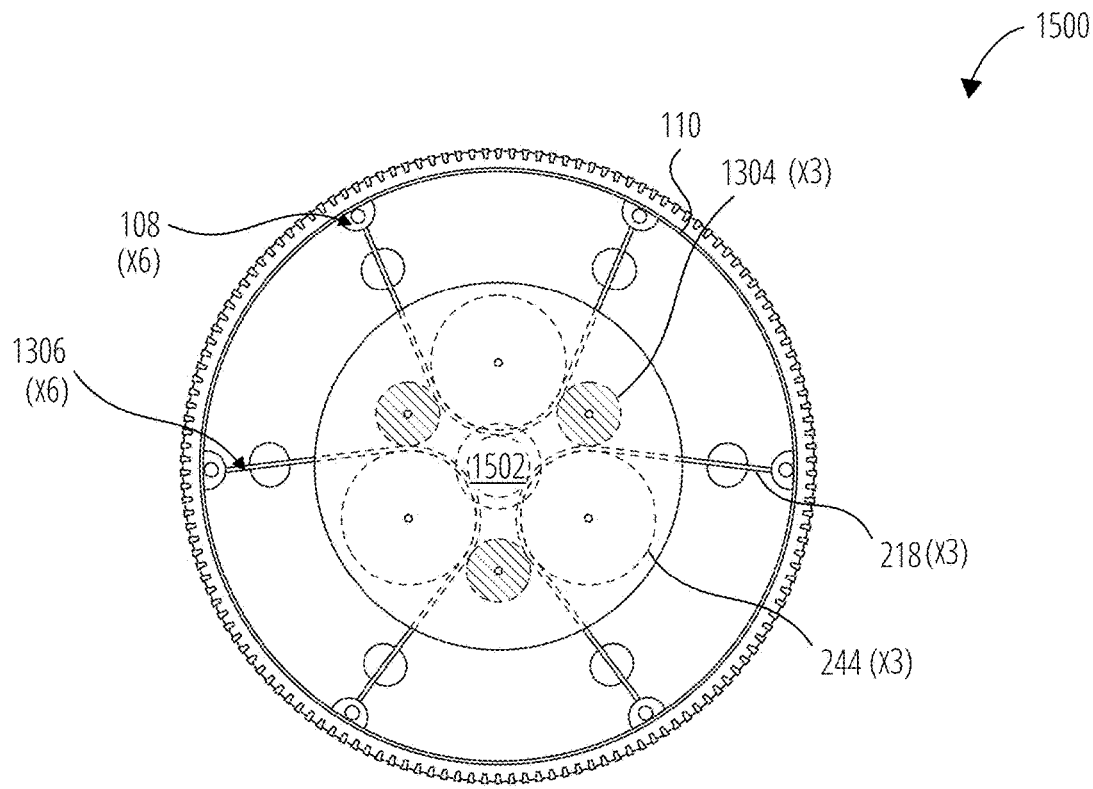
FIG. 15 illustrates a resilient wheel 1500 in accordance with one embodiment.

FIG. 15 illustrates a resilient wheel 1500 in accordance with one embodiment. The wheel hub 1502 of the resilient wheel 1500 may be configured with three single band diverters 244 and three dual band diverters 1304 configured to capture and direct three spoke bands 218 to form six single-band spokes 1306 attached to the flexible rim 110 by six universal hinge joints 108, similar to the resilient wheel 1400 illustrated in FIG. 14. However, as shown in FIG. 15, the dual band diverters 1304 may differ in size significantly from the single band diverters 244, provided the geometry of their placement within the wheel hub 1502 maintains them in rolling contact with the two adjacent spoke bands 218 forming adjacent single-band spokes 1306. This smaller sizing of dual band diverters 1304 may permit the configuration of a smaller wheel hub.

Figure 16:
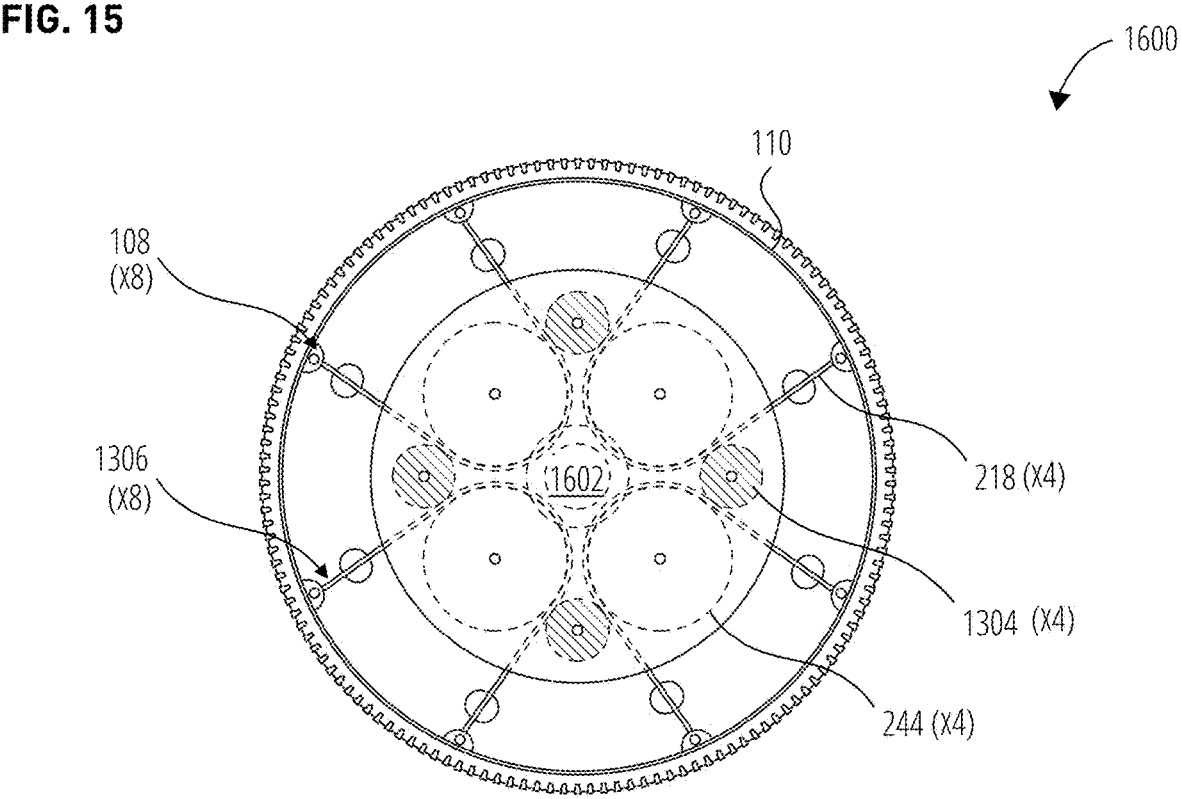
FIG. 16 illustrates a resilient wheel 1600 in accordance with one embodiment.

FIG. 16 illustrates a resilient wheel 1600 in accordance with one embodiment. The wheel hub 1602 of the resilient wheel 1600 may be configured to contain and direct four spoke bands 218 using four single band diverters 244 and four dual band diverters 1304 to form a resilient wheel 1600 with eight single-band spokes 1306 attached to the flexible rim 110 by eight universal hinge joints 108.

Figure 17:
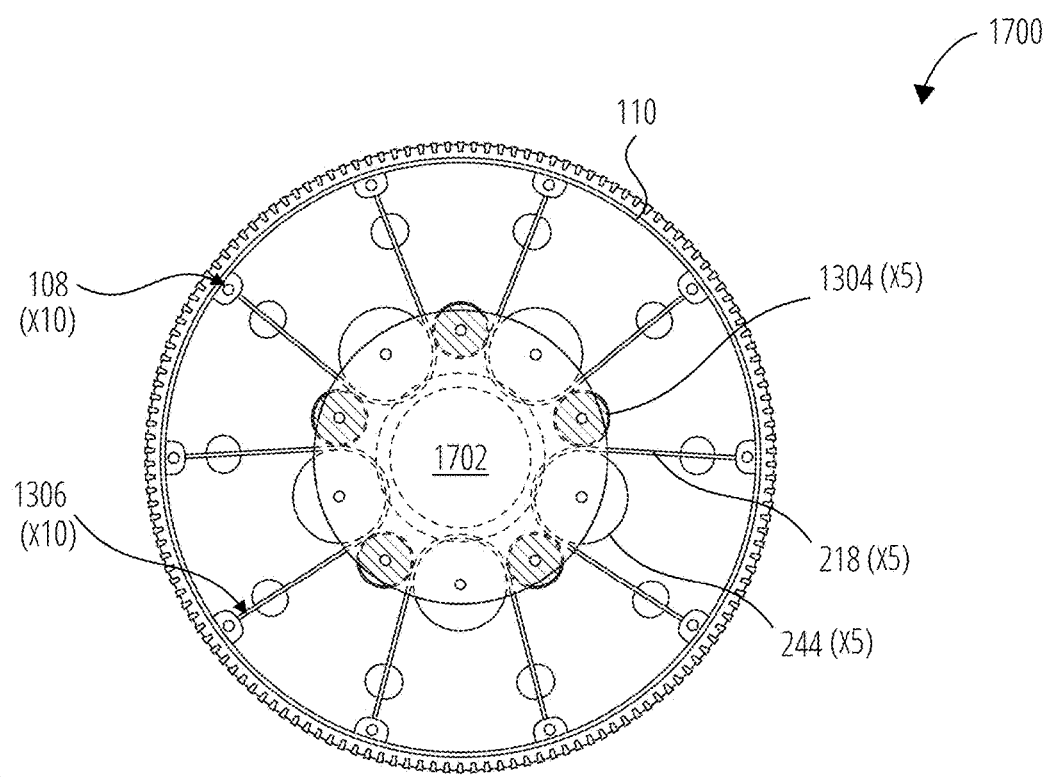
FIG. 17 illustrates a resilient wheel 1700 in accordance with one embodiment.

FIG. 17 illustrates a resilient wheel 1700 in accordance with one embodiment. The wheel hub 1702 of the resilient wheel 1700 may be configured to contain and direct five spoke bands 218 using five single band diverters 244 and five dual band diverters 1304 to form a resilient wheel 1700 with ten single-band spokes 1306 attached to the flexible rim 110 by ten universal hinge joints 108. The flexible rim 110 may take on a pentagonal configuration under load.

Figure 18:
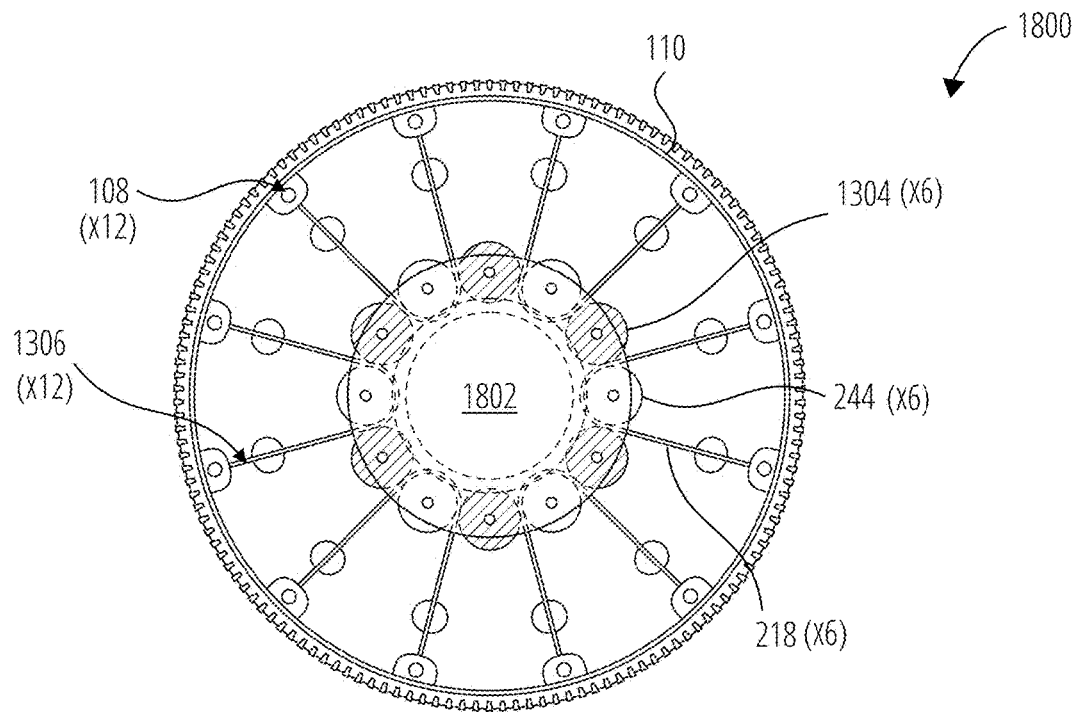
FIG. 18 illustrates a resilient wheel 1800 in accordance with one embodiment.

FIG. 18 illustrates a resilient wheel 1800 in accordance with one embodiment. The wheel hub 1802 of the resilient wheel 1800 may be configured to contain and direct six spoke bands 218 using six single band diverters 244 and six dual band diverters 1304 to form a resilient wheel 1700 with twelve single-band spokes 1306 attached to the flexible rim 110 by twelve universal hinge joints 108. The flexible rim 110 may take on a hexagonal configuration under load.

Figure 19:
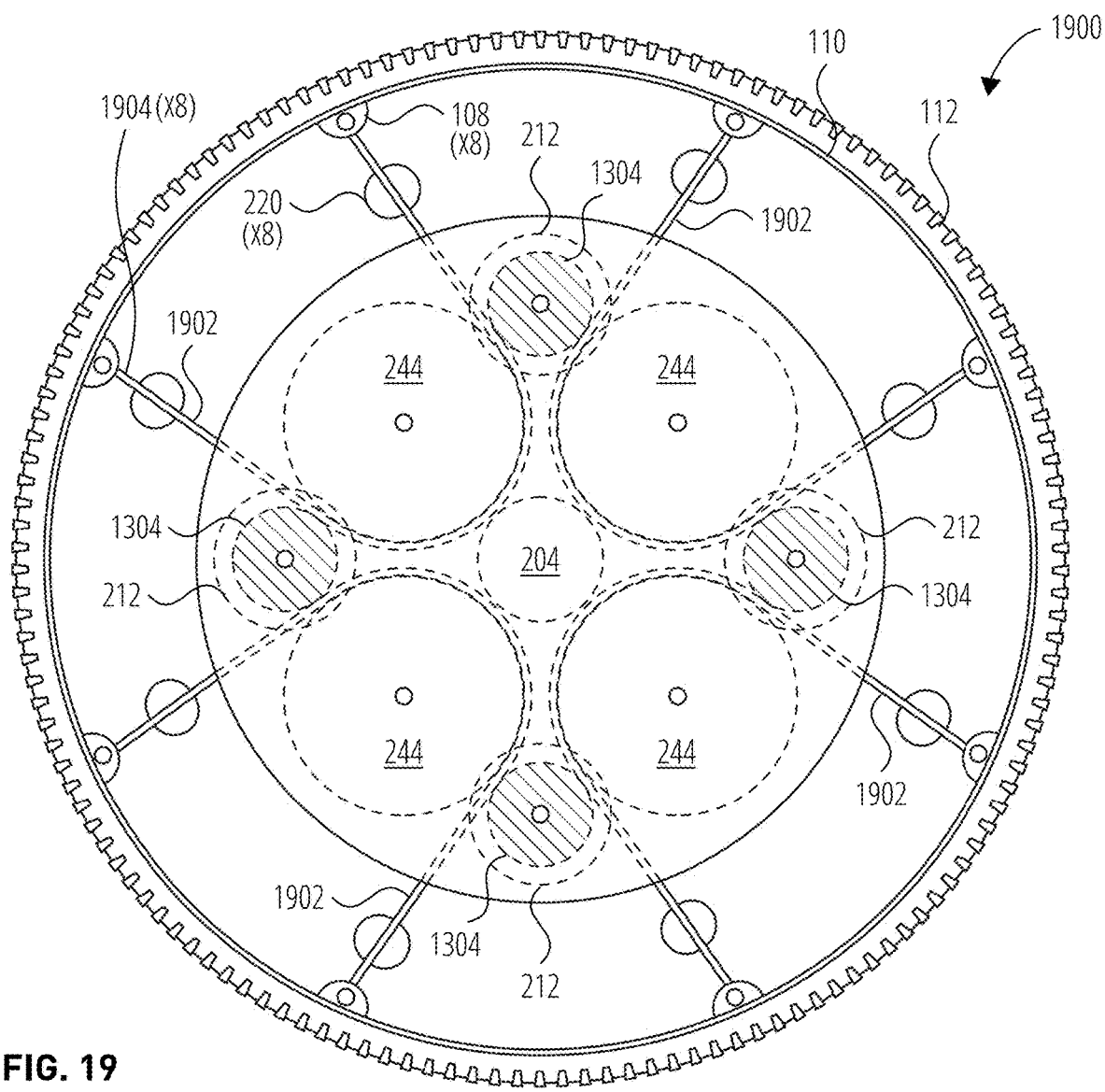
FIG. 19 illustrates a resilient wheel 1900 in accordance with one embodiment.

FIG. 19 illustrates a resilient wheel 1900 in accordance with one embodiment. The four distinct spoke bands 1902 each pivot over one of four single band diverters 244 at the hub and attach at both ends to the flexible rim 110 through eight universal hinge joints 108 to form eight single-band spokes 1904. Four dual band diverters 1304 constrain the motion of adjacent pairs of single-band spokes 1904 where those pairs are formed from the ends of two distinct spoke bands 1902. The resilient wheel 1900 includes a tire 112 and spoke brake assemblies 220 as described for previous embodiments.

Figure 7A:
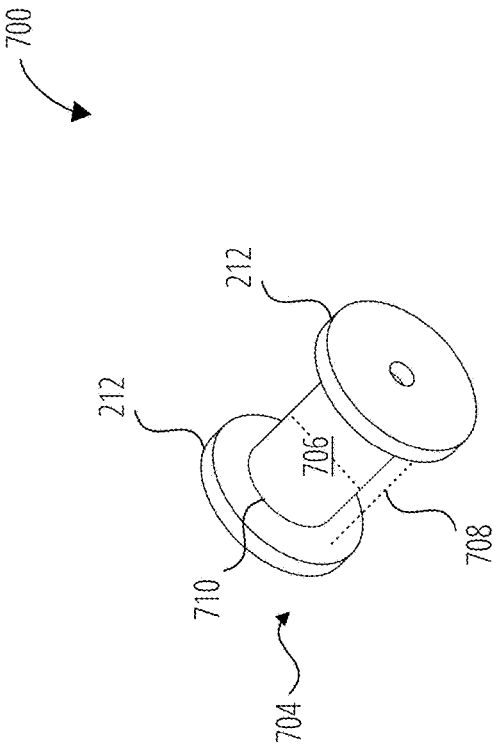
FIG. 7A-FIG. 7H illustrate diverter rollers 700 in accordance with various embodiments.
Figure 7B:
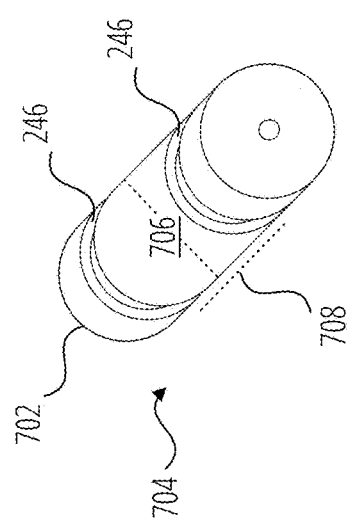
Figure 7C:
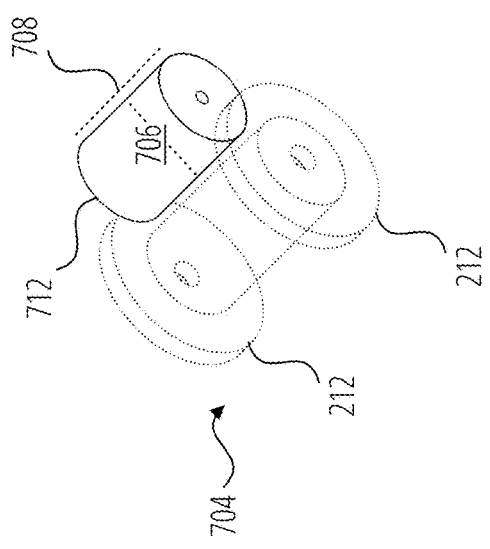
Figure 7D:
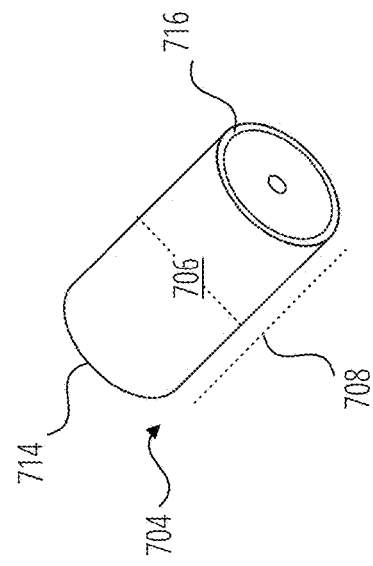
Figure 7F:
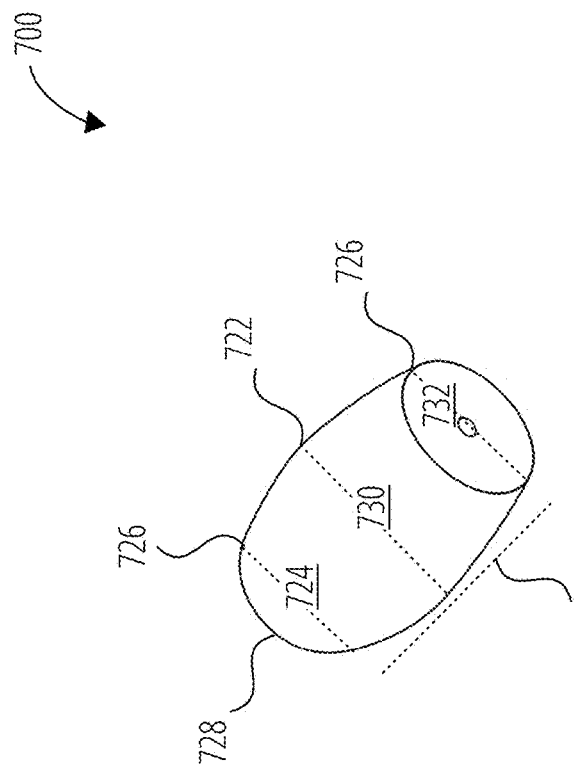
Figure 7E:
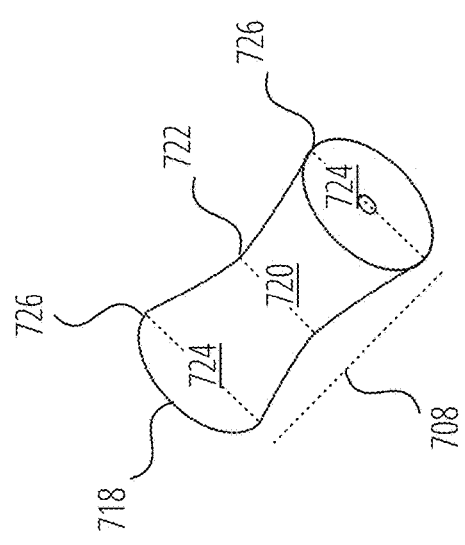
Figure 7H:
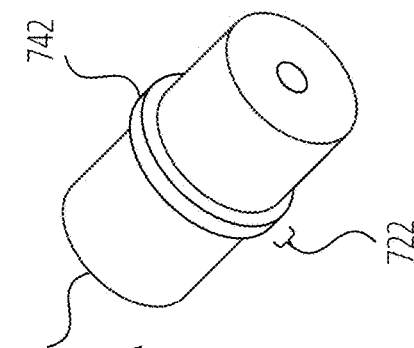
Figure 7G:
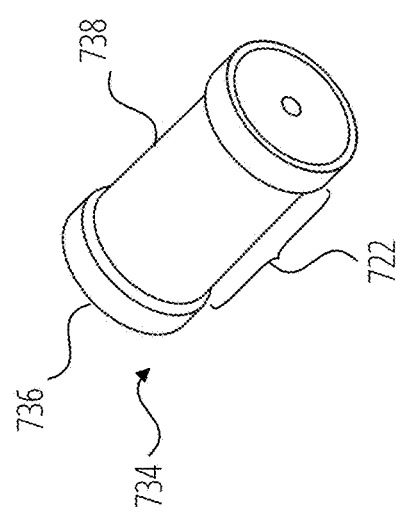

The resilient wheel 1900 may incorporate spoke band retention flanges 212 on the dual band diverters 1304 rather than the central axle 204, as is illustrated here. The single band diverters 244 in one embodiment may include retention flange gaps 246 as previously described. In another embodiment, the single band diverters 244 may be narrow rollers 712 as illustrated in FIG. 7C, where the diverter is formed from a roller narrow enough to fit within the span of the spoke band retention flanges 212.

Figure 20:
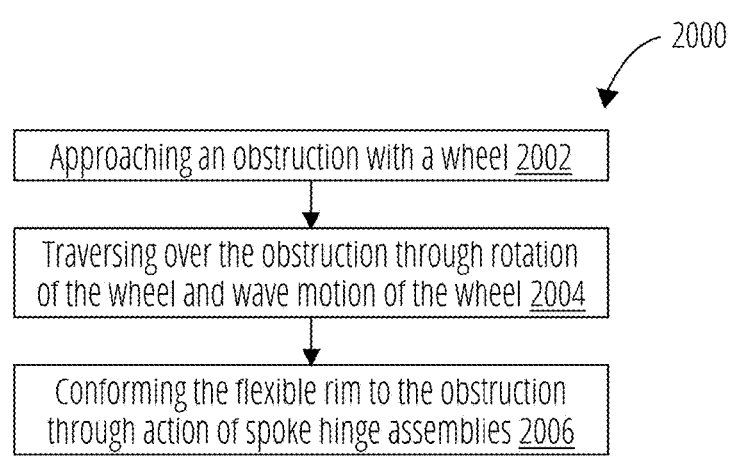
FIG. 20 illustrates a routine 2000 in accordance with one embodiment.

FIG. 20 illustrates an example routine 2000 for a resilient wheel, such as the embodiments disclosed herein, traversing a terrain including an obstruction. Although the example routine 2000 depicts a particular sequence of operations, the sequence may be altered without departing from the scope of the present disclosure. For example, some of the operations depicted may be performed in parallel or in a different sequence that does not materially affect the function of the routine 2000. In other examples, different components of an example device or system that implements the routine 2000 may perform functions at substantially the same time or in a specific sequence.

According to some examples, the method includes approaching an obstruction with a wheel at block 2002. For example, the resilient wheel 100 illustrated in FIG. 1A may approaching an obstruction with a wheel. The wheel may include a hub assembly, a flexible rim, and a spoke band assembly. The spoke band assembly may extend from the hub assembly to the flexible rim to form a plurality of spokes from the plurality of distinct spoke bands of the spoke band assembly. In one embodiment, each spoke of the plurality of single-band spokes is formed from distinct spoke bands separated apart by a plurality of single band diverters and a plurality of dual band diverters. The pluralities of diverters may be part of the hub assembly. In one embodiment, distinct spoke bands may be connected to each other by their ends in pairs at or near the rim to form a plurality of spokes. Single band diverters may direct and divert the distinct spoke bands of such a spoke band assembly.

According to some examples, the method includes traversing over the obstruction through rotation of the wheel and wave motion of the wheel at block 2004. Each spoke may have a spoke length defined to be a distance along the spoke from a point of contact of the spoke on the flexible rim to a point of origin of the spoke at the hub assembly. The spoke band assembly may be configured such that contact of the flexible rim with an object as the wheel moves forward causes the spoke length of a number of the spokes to shorten and the spoke length of an equal number of the spokes to lengthen. Thus the wave motion may include a complementary shortening and elongating of the plurality of single-band spokes as the hub assembly travels along an advance spoke and the advance spoke rotates downward and becomes a grounded spoke. The advance spoke may be elongated and the grounded spoke may be shortened as loading forces upon the wheel act to compress the grounded spoke.

According to some examples, the method includes conforming the flexible rim to the obstruction through action of spoke hinge assemblies at block 2006. The spoke hinge assemblies may include universal hinge joints configured to attach each spoke of the plurality of spokes to the flexible rim. The spoke hinge assemblies may include a hinge collar, a shouldered fastener, and a hinge collar sleeve. The flexible rim may maintain a memory of a desired shape. The hinge collar, the shouldered fastener, the hinge collar sleeve, and the memory of the flexible rim may configure the universal hinge joint to be spring-loaded and self-righting to a desired plumb position, allowing the wheel to conform to a terrain including the obstruction.

Figure 21:
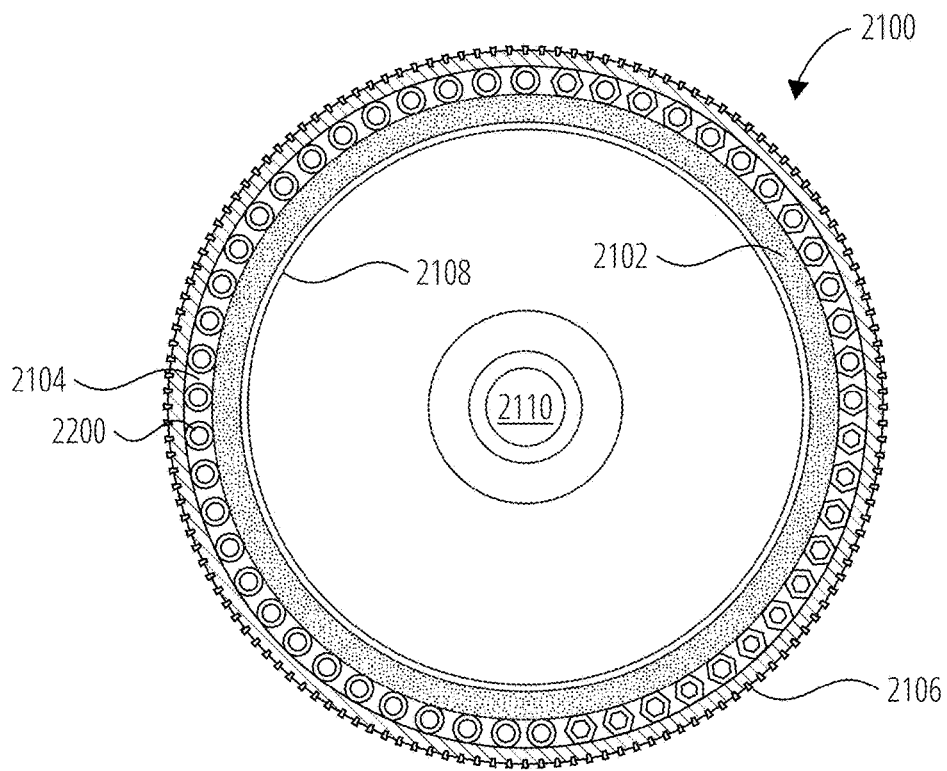
FIG. 21 illustrates a terrain conforming tire 2100 in accordance with one embodiment.

FIG. 21 illustrates a terrain conforming tire 2100 in accordance with one embodiment. The terrain conforming tire 2100 may comprises an inner layer 2102, a tubing layer 2104, and a treaded outer layer with a standard tire tread 2106. These may be mounted on a rim 2108 coupled to a hub 2110. The thicknesses of these layers included in the terrain conforming tire 2100 may vary, and the scale indicated in FIG. 21 is not intended to limit the scope of this disclosure.

The hub 2110 of the terrain conforming tire 2100 embodiment illustrated is a solid wheel hub. One of ordinary skill in the art will readily appreciate that a tire comprising the layers described may be similarly affixed to other types of wheel hubs, such as that used to form a spoked bicycle wheel or the hub assembly and flexible rim of the present disclosure.

The inner layer 2102 may be formed from Santoprene rubber in one embodiment. Other flexible and elastic materials may also be used. The tubing layer 2104 may include terrain conforming tire tubing and inserts 2200 such as are described in greater detail with respect to FIG. 22A-FIG. 22I. In FIG. 21 the tubing layer 2104 is shown with both hexagonal and cylindrical tubing for illustrative purposes. An embodiment may typically use a single tubing shape for the entire tubing layer 2104.

The tubing of the tubing layer 2104 may be manufactured from Santoprene rubber or similar materials. Tubing shapes which may be used to implement a terrain conforming tire 2100 of the designs disclosed herein are illustrated and described below. A type of rubber known as continuous-flex Santoprene may be used. This family of rubber includes TPE and TPV materials. TPV is a mixture of polypropylene and EPDM rubber. This family of rubber is noted for enhanced flexibility and superior memory characteristics. In some embodiments the tubing used may be formed from fabric-reinforced, neoprene rubber, or other materials imparting the desired resilience and flexibility.

The treaded outer layer with a standard tire tread 2106 may be manufactured from bands of fabric-reinforced, neoprene rubber. Fiber reinforcement may implement a number of types of weave, such as cotton/polyester, nylon, fiberglass, etc. This may allow the treaded outer layer with a standard tire tread 2106 to bend, but not stretch. The treaded outer layer with a standard tire tread 2106 may include grooves and ridges on its outer surface. These grooves and ridges may be designed to redirect water and increase friction against terrain surfaces, thereby improving traction of the tire over various types of terrain.

The layers of the terrain conforming tire 2100 may be molded together as an integrated unit, or may be molded separately and bonded together, for example during vulcanization, using processes that are well understood in the art. This may involve forming a complex compound of elements into green rubber. This green rubber may be injected into or compressed within a mold under pressure and heat. As part of this process, vulcanization may include sulfur and zinc oxide which cures the rubber material through crosslinking. The mold may establish the shape of the tire (internally and externally). In doing so, the configuration of tubing shape, relational spacing of parts, and location of piles (fiber-strands) for the tire may be established through the mold. In one embodiment Santoprene rubber may be used for the tire. Another rubber having similar characteristics to Santoprene, may be used as well.

The disclosed terrain conforming tire offers a number of benefits and represents a technological improvement over conventional tire solutions. The design of the terrain conforming tire prevents debris from becoming lodged within the tread of the tire. It forms a sling as described below such that debris is ejected downward rather than upward, reducing the chance that road debris becomes lodged in and is thrown upward from tires in traffic. This may prevent hood and windshield damage to following vehicles. The design increases the grip the tire may achieve as the tubing of the tubing layer acts as cleats over irregular terrain. The disclosed design may also incur less rolling resistance or drag. Because the tire tread of the terrain conforming tire partially envelops debris and irregularity in the terrain, it avoids collisions with objects that may result in lost momentum and energy, while the internal cleat behavior of the tubing layer maintains traction.

Figure 22A:
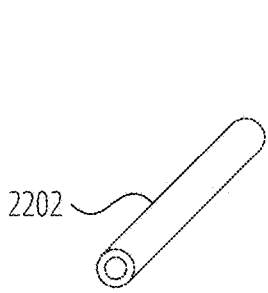
FIG. 22A-FIG. 22I illustrate terrain conforming tire tubing and inserts 2200 in accordance with various embodiments.
Figure 22B:
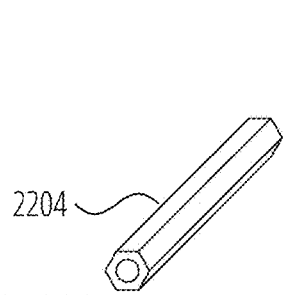
Figure 22C:
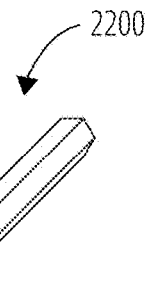
Figure 22D:
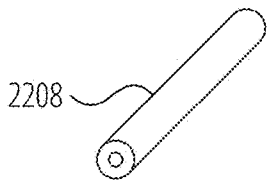
Figure 22E:
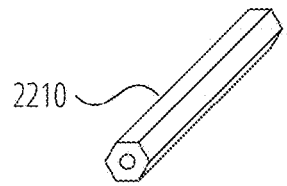
Figure 22F:
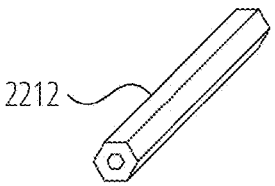

FIG. 22A-FIG. 22I illustrate terrain conforming tire tubing and inserts 2200 in accordance with various embodiments. FIG. 22A-FIG. 22C illustrate low-durometer (more flexible) tubing, including low durometer cylindrical tubing 2202, low durometer hexagonal tubing with a circular orifice 2204, and low durometer hexagonal tubing 2206. FIG. 22D-FIG. 22F illustrate high durometer (still flexible but more rigid) tubing, including high durometer cylindrical tubing 2208, high durometer hexagonal tubing with a circular orifice 2210, and high durometer hexagonal tubing 2212.

The tubing may be formed from Santoprene rubber, and the different durometers of hardness may be imparted by different wall thicknesses. In some embodiments, different material compositions may be used to reduce or increase durometer. Additional polygonal profiles for tubing used in this implementation may also be of use. For example, square tubing with sharp or rounded corners and a cylindrical orifice may be used in some configurations. The tubing layer 2104 shown in FIG. 21 may incorporate cutouts to accommodate polygonal tubing, expanding the surface area contact between tubing and the other layers of the terrain conforming tire 2100 and thus improving wheel durability.

Figure 22G:
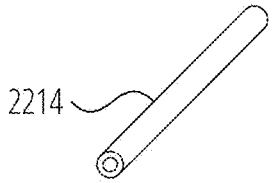
Figure 22H:
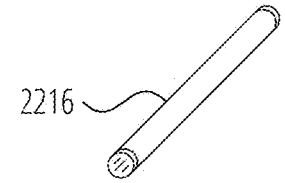
Figure 22I:
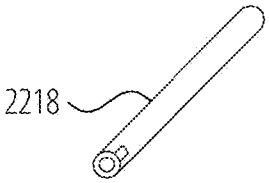
Figure 23A:
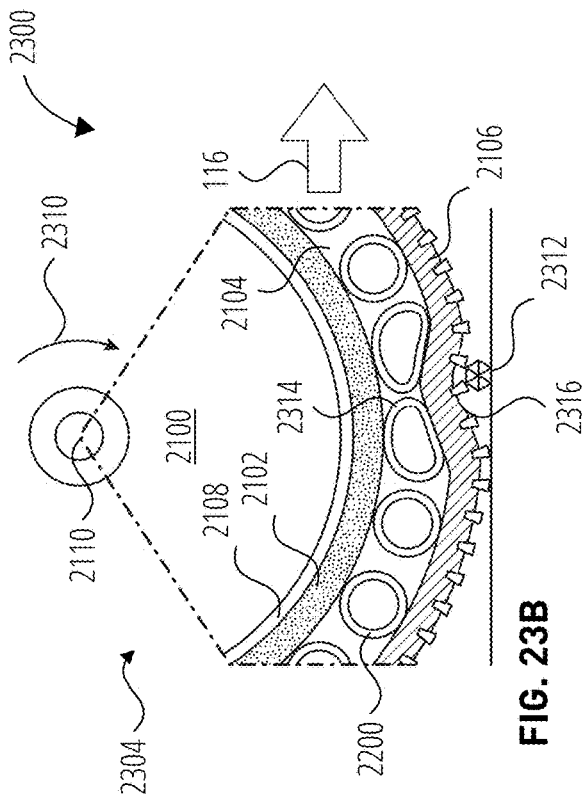
FIG. 23A-FIG. 23D illustrate terrain conforming tire performance 2300 in accordance with one embodiment.
Figure 23B:
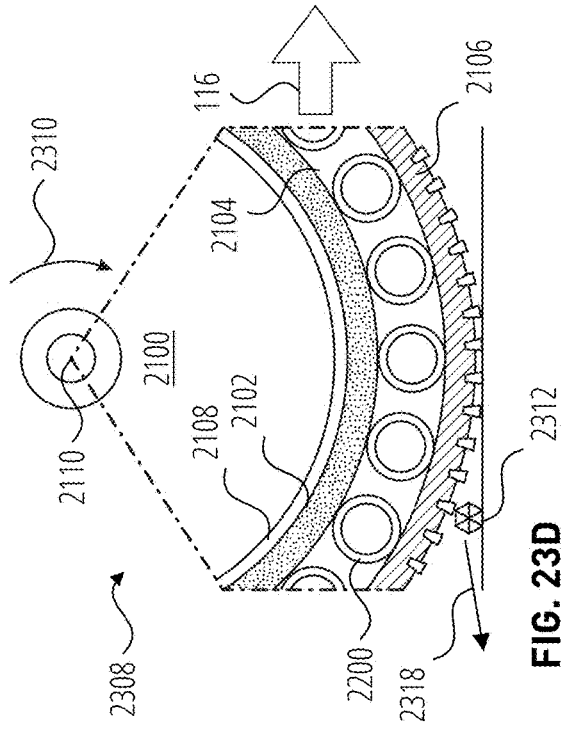
Figure 23C:
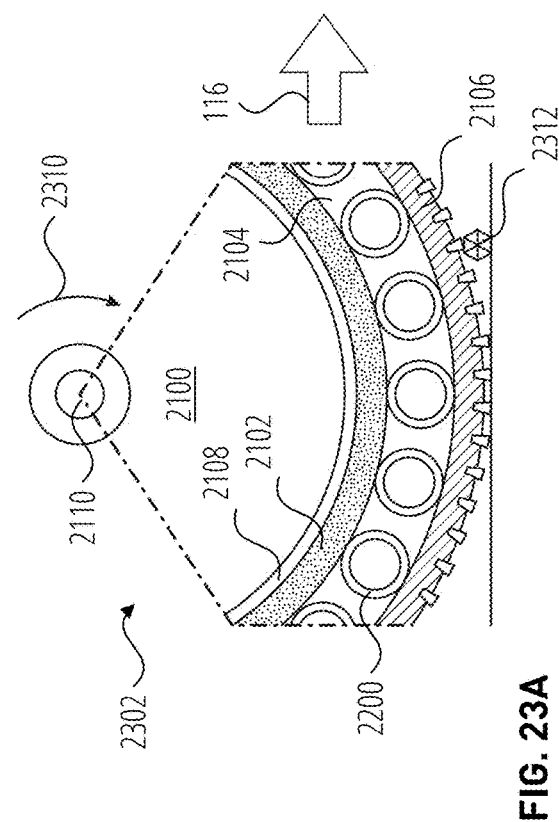
Figure 23D:
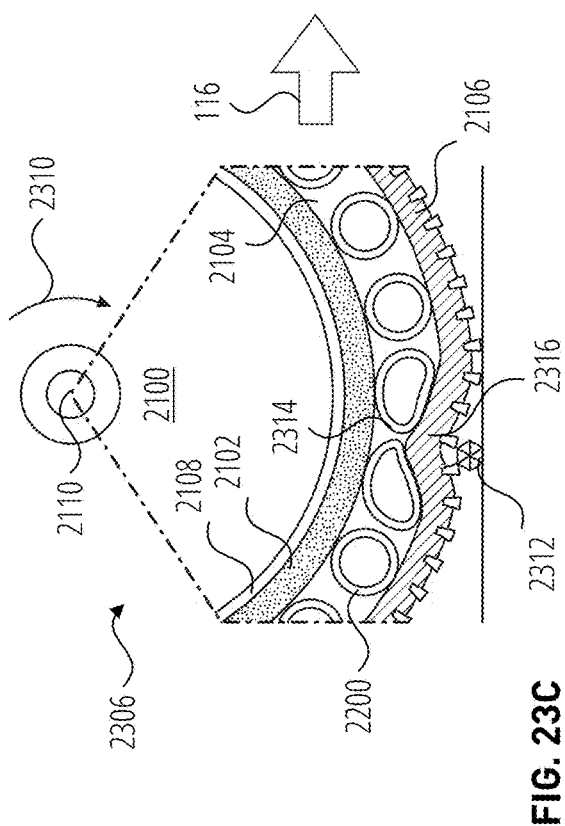

FIG. 22G-FIG. 22I illustrate inserts that may fit within low durometer tubing, including open cell inserts 2214, closed cell inserts 2216, and inflatable inserts 2218. These inserts may be formed from open-cell or closed-cell (enclosed cavity) rubber/plastic tubes. In the case of closed-cell rubber/plastic tubes, they may be manufactured to have a set pressure or have a needle valve to inflate them to a set pressure. Closed cell inserts 2216 may be inflated with air or another gas and sealed to maintain a desired pressure, providing a desired level of flexibility and resilience. Inflatable inserts 2218 may be inflated to a desired level and subsequently deflated, providing a custom level of gas pressure. These options for the tubing layer may be selectively varied to provide a terrain conforming tire 2100 having the desired flexibility and resilience to conform to particular terrain conditions. The inserts of FIG. 22G-FIG. 22I may incorporate different wall thicknesses to accommodate atmospheric pressure as well as lower and higher pressures. In one embodiment an insert with a non-uniform cross section, such as a chain of balls or beads, may be used. Such configurations may impart additional flexibility of the terrain conforming tire 2100 in a dimension normal to the direction of travel, further improving the ability of the tire to conform to the terrain it traverses.

FIG. 23A-FIG. 23D illustrate terrain conforming tire performance 2300 in accordance with one embodiment. A terrain conforming tire 2100 is shown traveling in a direction of motion 116 to accomplish steps 2302, 2304, 2306, and 2308. The terrain conforming tire 2100 comprises the hub 2110, rim 2108, inner layer 2102, tubing layer 2104, and treaded outer layer with a standard tire tread 2106 introduced with respect to FIG. 21.

In step 2302, the terrain conforming tire 2100 may be seen traveling in the direction of motion 116 through tire rotation 2310 and approaching a piece of debris 2312. In step 2304, as the terrain conforming tire 2100 passes over the debris 2312, the treaded outer layer with a standard tire tread 2106 may be seen to bend 2316 and the tubing layer 2104 may be seen to compress 2314 due to the flexibility of the cylindrical tubing illustrated. The other tubing embodiments shown in FIG. 22A-FIG. 22F may exhibit similar behavior, which may be modified by still provide the flexibility needed to compress 2314 when debris 2312 is contacted when inserts such as are illustrated in FIG. 22G-FIG. 22I are utilized.

As the terrain conforming tire 2100 continues to traverse over the debris 2312 in step 2306, the tubing layer 2104 continues to compress 2314 and the treaded outer layer with a standard tire tread 2106 continues to bend 2316. In one embodiment, the elasticity and flexibility of these layers may contribute to form a pocket around the debris 2312, which may act as a sling to eject 2318 the debris 2312 from beneath the terrain conforming tire 2100, as indicated in step 2308 once the hub 2110 has passed over the debris 2312. The tubing of the tubing layer 2104 may have shape memory qualities such that they may eject 2318 the debris 2312 toward the terrain in a controlled manner upon rotation.

Put in other words, the treaded outer layer with a standard tire tread 2106 of the terrain conforming tire 2100 may include tread tire (for traction) and may bend 2316 into the spacing 2408 between tubes of the tubing layer 2104, which may compress 2314. This portion of the treaded outer layer with a standard tire tread 2106 may thus be suspended between the inner rubber tubing of the tire, conforming to the shape of the rock as a tire-sling in rotation. The sling forms a pouch partially around the matter and is pressed into a cavity (void) of the tire. Each cavity adjoins a pair of transverse, resilient, Santoprene tubes of the tire. In this manner, these layers may act as a sling that allows the terrain conforming tire 2100 to encompass either anchored ground rock or loose gravel. This sling action may promote uniform motion of the tire in rotation across rocky or debris-strewn terrain.

Since this tire-sling bends and does not stretch, it may compresses the pouch (with matter) and the pair of adjoining rubber tubes to form tension in rotation. As the tire rotates further, this tension may be released. The compressed pouch is ejected (shot back) with the tread re-conforming to the shape of the tire. The rock/dirt ejects toward the ground. In addition, the inner transverse tubes may function as a basis for traction and as cleats that grip raised portions of the terrain.

These cleats may be resilient rubber tubes within the tire structure. Their spring action in rotation of the tire may be influenced by the size, wall thickness, and durometer of the rubber within the tire. This spring action may be enhanced by inserting additional rubber/plastic tubing that snuggly fit within their inside cavity (inside diameter), such as the inserts illustrated in FIG. 22G-FIG. 22I. Thus, the rubber tubes of the tire may serve as housing for the additional rubber/plastic inserts.

In this manner, the tread of the terrain conforming tire may tend to comply with the terrain, leaving the soil less transformed when driven over. It may contact the terrain in a different fashion than that of the tread for a conventional tire. Matter on or within the top layer of the terrain may be enclosed within a temporary pouch to be ejected or used as an anchor for traction. The cleats formed by the tubing layer of the tire may be supplemented and are within the tire structure. They are not on the exterior surface of the tire. Thus, there may be less matter and debris that clings to the tire as it rotates.

FIG. 24A-FIG. 24E illustrate terrain conforming tire configurations 2400 in accordance with various embodiments. These terrain conforming tire configurations 2400 may be used in conjunction with a hub 2110 and rim 2108 to create embodiments of the terrain conforming tire 2100 introduced with respect to FIG. 21, as well as adhesive-backed, composite rubber strips 2500, adhesive-backed, composite rubber strips 2600, and adhesive terrain conforming tires 2700 described below.

Figure 24A:
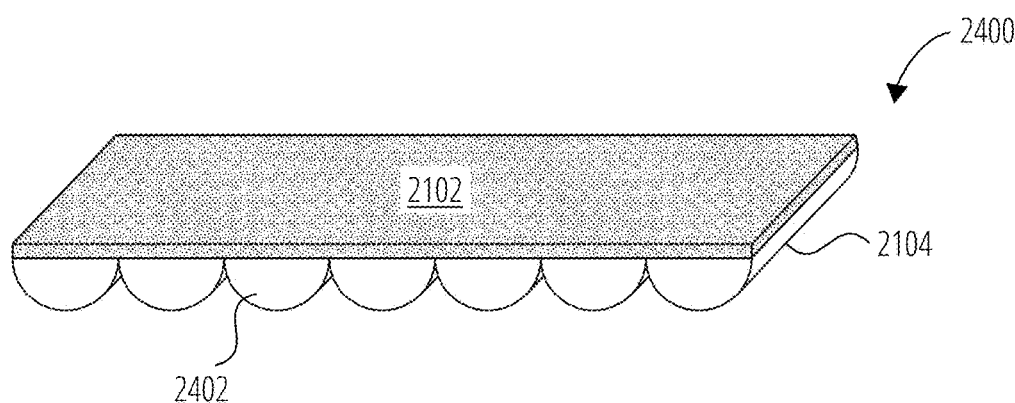
FIG. 24A-FIG. 24E illustrate terrain conforming tire configurations 2400 in accordance with various embodiments.
Figure 24B:
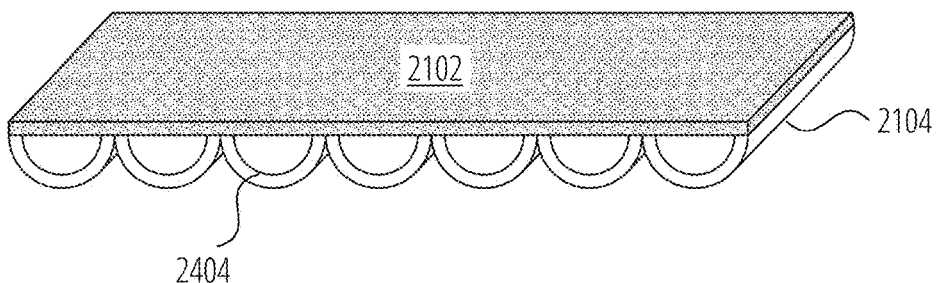

FIG. 24A illustrates a configuration including an inner layer 2102 and a tubing layer 2104 formed from solid half-cylinder tubing 2402. The solid half-cylinder tubing 2402 may provide enough traction that a treaded outer layer with a standard tire tread 2106 may be omitted, though it may be included in some embodiments. FIG. 24B illustrates a configuration including an inner layer 2102 and a tubing layer 2104 formed from hollow half-cylinder tubing 2404, where the treaded outer layer with a standard tire tread 2106 may similarly be omitted or included as desired. The transverse plastic/rubber tubes of the solid half-cylinder tubing 2402 may be formed from fiber-reinforced rubber cords. In one embodiment, the hollow half-cylinder tubing 2404 may be formed using half-round, fabric-reinforced, Santoprene rubber tubing.

Figure 24C:
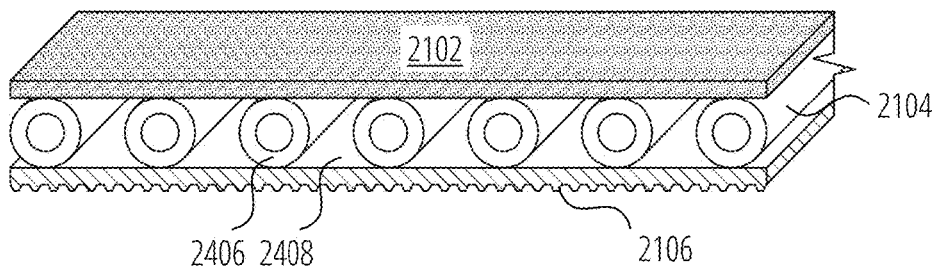

FIG. 24C illustrates a configuration including an inner layer 2102, a tubing layer 2104, and a treaded outer layer with a standard tire tread 2106. Each tube of the tubing layer 2104 may be spaced apart along the strip or ring to create intermittent cavities or voids, allowing the treaded outer layer with a standard tire tread 2106 to bend inward and enfold debris, as shown in FIG. 23A-FIG. 23D. This is indicated by spacing 2408 in the terrain conforming tire configurations 2400. The tubing layer 2104 may include hollow cylindrical tubing 2406 separated by uniform or variable spacing 2408 to contribute the desired flexibility and elasticity for a particular terrain. In one embodiment, the spacing 2408 may provide a gap between each pair of adjacent transverse plastic/rubber tube of the tire having a width of 70% of the diameter of the transverse plastic/rubber tubes.

Figure 24D:
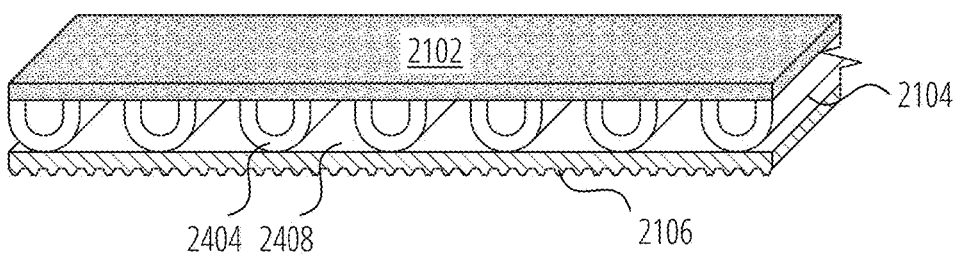
Figure 24E:
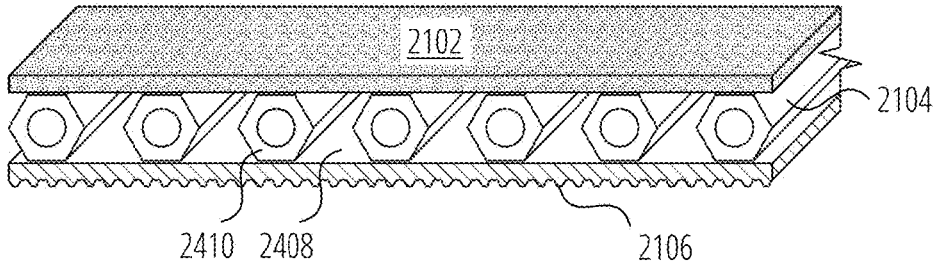

FIG. 24D illustrates a configuration comprising an inner layer 2102, a tubing layer 2104, and a treaded outer layer with a standard tire tread 2106. The tubing layer 2104 may include hollow half-cylinder tubing 2404 separated by uniform or variable spacing 2408 to contribute the desired flexibility and elasticity for a particular terrain. FIG. 24E illustrates a configuration comprising an inner layer 2102, a tubing layer 2104, and a treaded outer layer with a standard tire tread 2106. The tubing layer 2104 may include hollow hexagonal tubing with a circular orifice 2410 separated by uniform or variable spacing 2408 to contribute the desired flexibility and elasticity for a particular terrain. The terrain conforming tire tubing and inserts 2200 previously described may be incorporated into similar configurations, as will be readily understood by one of ordinary skill in the art. In some embodiments, multiple tiers of tubing may be configured in the tubing layer 2104 to provide a thicker tire retaining the ability to bend and compress as described and illustrated in FIG. 23A-FIG. 23D. For example, the tubing layer 2104 may incorporate either a single or a double row of hexagonal orifice openings near the treaded outer layer with a standard tire tread 2106. In one embodiment, the tubing layer 2104 may include a layer of half-round, rubber/plastic tubes orientated in a transverse direction. The two legs of the half-round rubber tubes may join with the under-side of the inner layer 2102, facing upward toward the center of the wheel, such as is illustrated in FIG. 24B. Another layer may comprise transverse rows of half-round tubing joined with the upper face of the outer treaded outer layer, the two legs of each half-round tube facing away from the center of the wheel.

Figure 25:
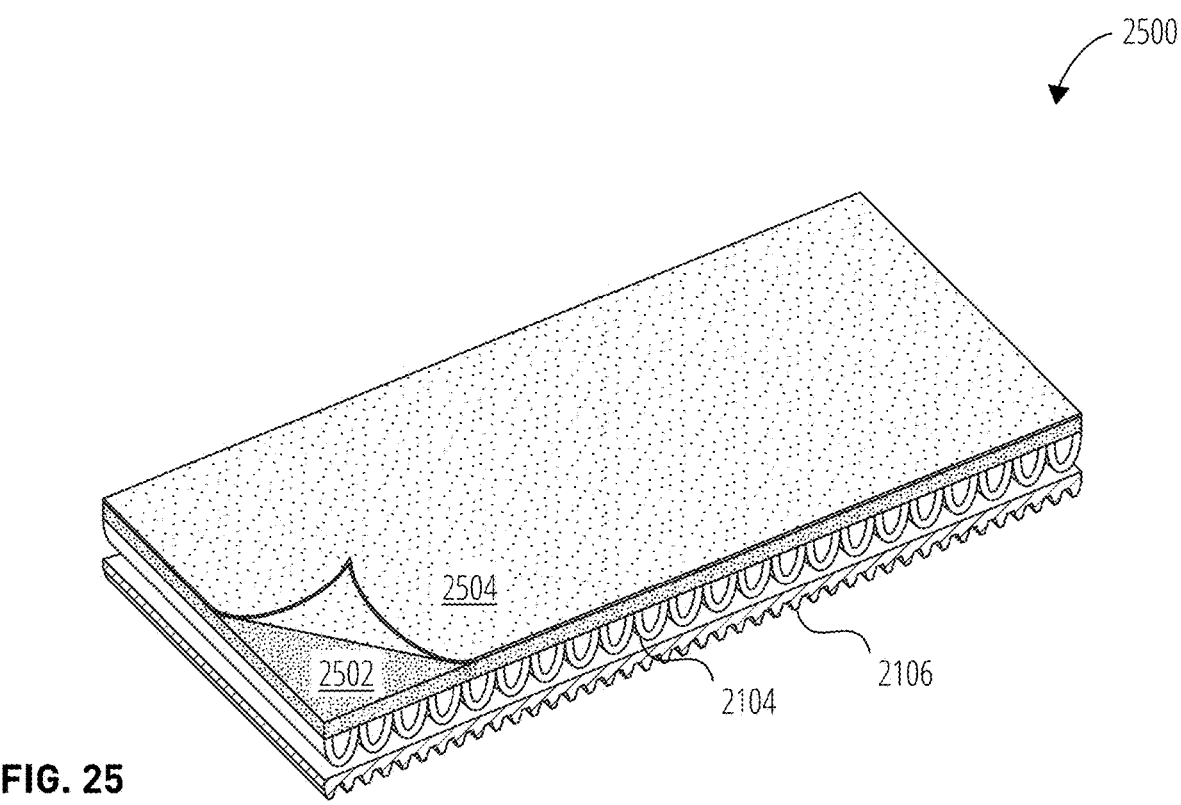
FIG. 25 illustrates an adhesive-backed, composite rubber strip 2500 in accordance with one embodiment.

FIG. 25 illustrates an adhesive-backed, composite rubber strip 2500 in accordance with one embodiment. The adhesive-backed, composite rubber strip 2500 may incorporate configurations as described with respect to FIG. 21-FIG. 24E, such as the tubing layer 2104 and a treaded outer layer with a standard tire tread 2106. The adhesive-backed, composite rubber strip 2500 may further incorporate an adhesive inner layer 2502, similar in substance to the inner layer 2102 previously described, but providing an adhesive surface such that the adhesive-backed, composite rubber strip 2500 may be applied to a rim 2108 as an easily placed, removed, and replaced tire material, facilitating repair of terrain conforming tire 2100 configurations. An acrylic adhesive may be used to form the adhesive surface of the adhesive inner layer 2502. A peel back removable layer 2504 may protect the adhesive inner layer 2502 until it is removed for application of the adhesive-backed, composite rubber strip 2600 to a rim.

Figure 26:
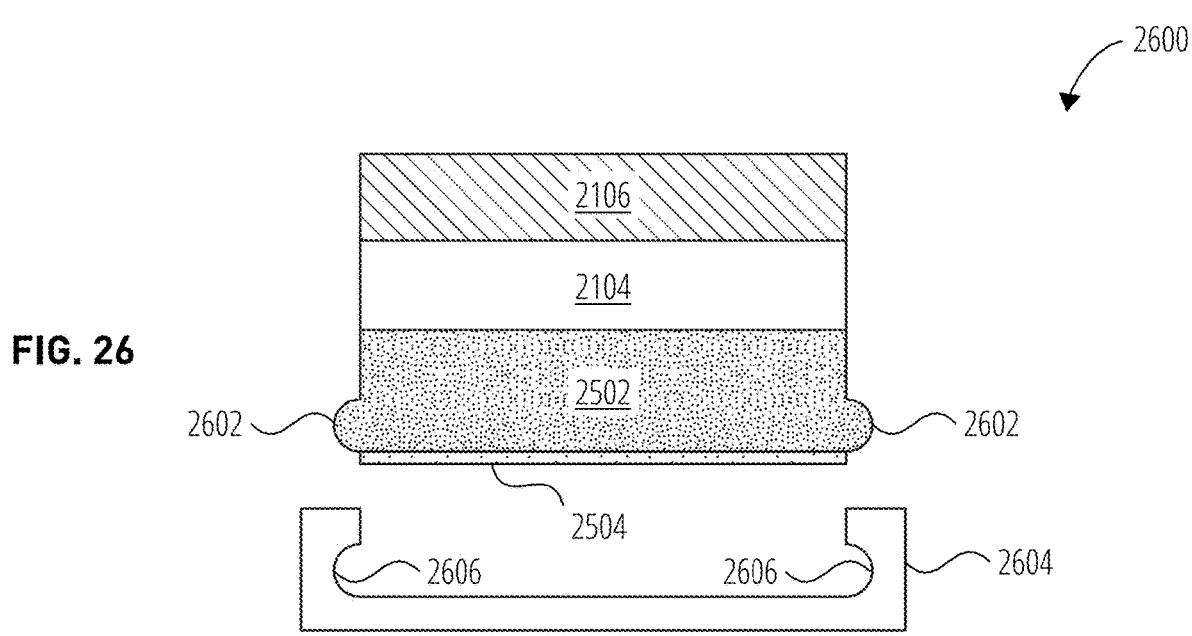
FIG. 26 illustrates an adhesive-backed, composite rubber strip 2600 in accordance with one embodiment.

FIG. 26 illustrates an adhesive-backed, composite rubber strip 2600 in accordance with one embodiment. The adhesive inner layer 2502 of the adhesive-backed, composite rubber strip 2600 may include a tire bead 2602, i.e., a protrusion along the sides of the adhesive-backed, composite rubber strip 2600 which may press into a bead seat 2606 configured as part of a rim 2604, similar to configurations for typical bicycle wheel rims. The adhesive inner layer 2502 in combination with the tire bead 2602 may retain the adhesive-backed, composite rubber strip 2600 within the rim 2604 of the wheel.

Figure 27:
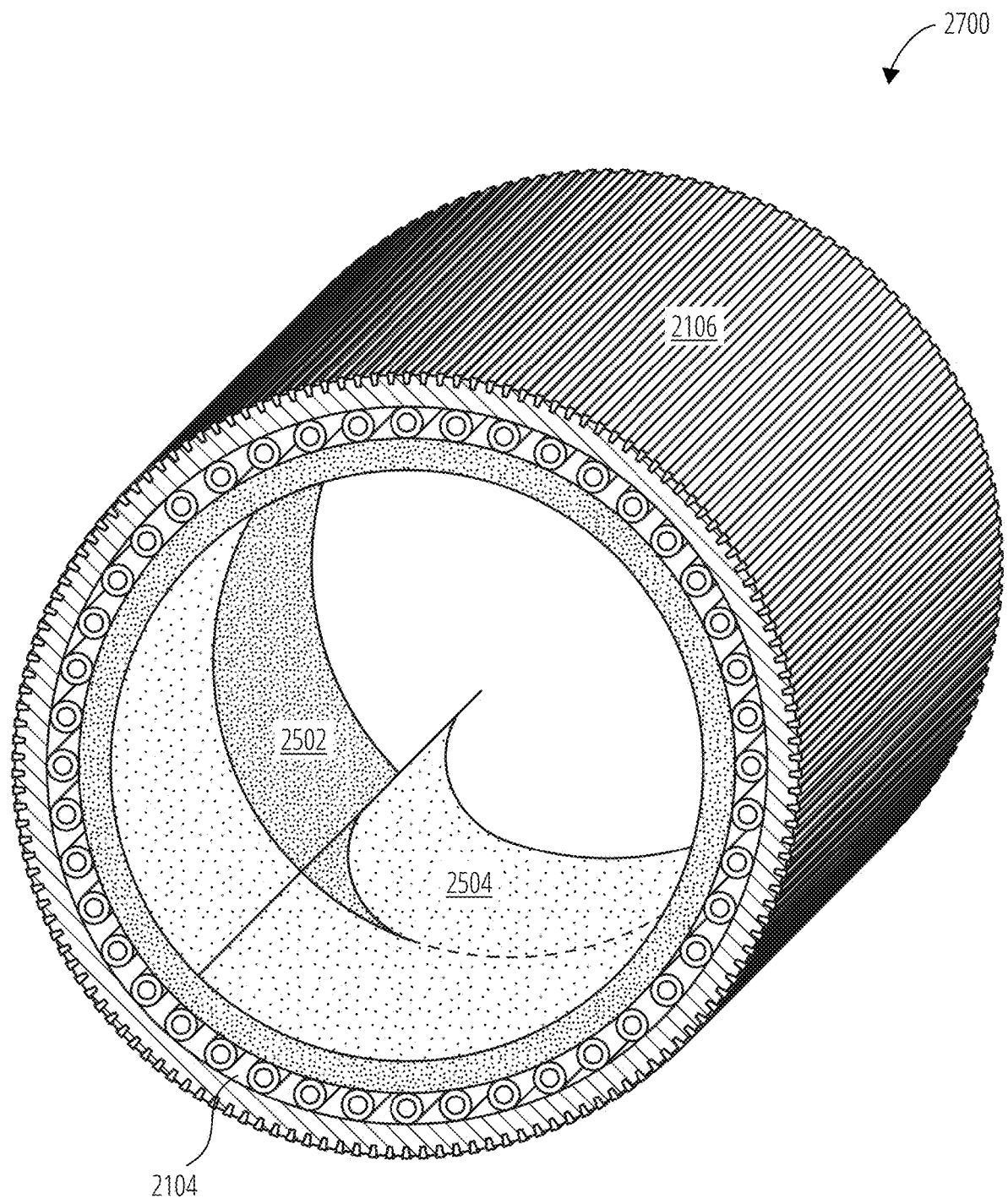
FIG. 27 illustrates an adhesive terrain conforming tire 2700 in accordance with one embodiment.

FIG. 27 illustrates an adhesive terrain conforming tire 2700 in accordance with one embodiment. The adhesive terrain conforming tire 2700 may incorporate the adhesive inner layer 2502, peel back removable layer 2504, the tubing layer 2104, and treaded outer layer with a standard tire tread 2106 previously described. The adhesive terrain conforming tire 2700 may be manufactured as a complete cylindrical tire using these components. The adhesive terrain conforming tire 2700 may be stretched over and adhere to a rim as a single piece.

In one embodiment, the adhesive terrain conforming tire 2700 may be stretched over a rim, after which tubing inserts such as are illustrated in FIG. 22G-FIG. 22I may be inserted in the tubing of the treaded outer layer with a standard tire tread 2106. When these inserts are incorporated, the adhesive terrain conforming tire 2700 may become less likely to stretch and become dislodged from the rim.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A wheel, comprising:
   a hub assembly;
   a flexible rim;
   a spoke band assembly extending from the hub assembly to the flexible rim to form a plurality of single-band spokes, the spoke band assembly comprising a plurality of distinct spoke bands;
   wherein each spoke of the plurality of single-band spokes is formed from the plurality of distinct spoke bands separated apart by a plurality of single band diverters and a plurality of dual band diverters;
   wherein the plurality of single band diverters and the plurality of dual band diverters are part of the hub assembly, and each of the plurality of dual band diverters is configured to press against two adjacent spoke bands of the plurality of distinct spoke bands and rotate in the same direction as the two adjacent spoke bands, resulting in each of the two adjacent spoke bands traveling in opposite directions;
   wherein each spoke has a spoke length defined to be a distance along the spoke from a point of contact of the spoke on the flexible rim to a point of origin of the spoke at the hub assembly; and
   wherein the spoke band assembly is configured such that contact of the flexible rim with an object as the wheel moves forward causes the spoke length of a number of the spokes to shorten and the spoke length of an equal number of the spokes to lengthen.

2. The wheel of claim 1, wherein each of the plurality of dual band diverters include flanged sides configured to maintain alignment of the plurality of distinct spoke bands.

3. The wheel of claim 1, further comprising spoke hinge assemblies, wherein each spoke hinge assembly includes a hinge collar, a shouldered fastener, and a hinge collar sleeve.

4. The wheel of claim 1, further comprising spoke brake assemblies, wherein each spoke brake assembly includes spoke brakes and spoke brake fasteners.

5. The wheel of claim 4, wherein the spoke brakes are half-round spoke brakes that are placed on either side of each spoke of the plurality of single-band spokes, and are fastened together by the spoke brake fasteners, which pass through aligned holes in the spoke and half-round spoke brakes.

6. A wheel, comprising:
   a hub assembly;
   a flexible rim;
   a spoke band assembly extending from the hub assembly to the flexible rim to form a plurality of spokes, the spoke band assembly comprising a plurality of spoke bands;
   spoke hinge assemblies including universal hinge joints, configured to attach each spoke of the plurality of spokes to the flexible rim and support two directions of rotation of each spoke of the plurality of spokes with respect to the flexible rim;
   wherein each spoke is formed from the plurality of spoke bands separated apart by a plurality of diverters;
   wherein the plurality of diverters are part of the hub assembly;
   wherein each spoke has a spoke length defined to be a distance along the spoke from a point of contact of the spoke on the flexible rim to a point of origin of the spoke at the hub assembly; and
   wherein the spoke band assembly is configured such that contact of the flexible rim with an object as the wheel moves forward causes the spoke length of a number of the spokes to shorten and the spoke length of an equal number of the spokes to lengthen.

7. The wheel of claim 6, wherein the spoke hinge assemblies include a hinge collar, a shouldered fastener, and a hinge collar sleeve.

8. A wheel, comprising:
   an axle assembly, including:
      a central axle; and
      one or two spoke band retention flanges configured to align a plurality of spoke bands across a surface of a plurality of diverters;
   a hub assembly, including:
      the axle assembly; and
      the plurality of diverters;
   a spoke band assembly, including the plurality of spoke bands; and
   a flexible rim;
   wherein the spoke band assembly extends from the hub assembly to the flexible rim to form a plurality of spokes, each spoke being formed from the plurality of spoke bands separated apart by the plurality of diverters, each spoke having a spoke length defined to be a distance along the spoke from a point of contact of the spoke on the flexible rim to a point of origin of the spoke at the hub assembly;

wherein the spoke band assembly is configured such that contact of the flexible rim with an object as the wheel moves forward causes the spoke length of a number of the spokes to shorten and the spoke length of an equal number of the spokes to lengthen; and wherein the one or two spoke band retention flanges aligns the spoke band assembly into one central plane normal to the central axle.

9. The wheel of claim 8, wherein each of the plurality of diverters includes at least one retention flange gap configured to receive the one or two spoke band retention flanges.

10. The wheel of claim 8, further comprising spoke hinge assemblies, wherein the spoke hinge assemblies include:
a hinge collar;
a shouldered fastener; and
a hinge collar sleeve.

11. The wheel of claim 8, further comprising spoke brake assemblies, wherein the spoke brake assemblies include:
spoke brakes; and
spoke brake fasteners.

12. The wheel of claim 11, wherein the spoke brakes are half-round spoke brakes that are placed on either side of a corresponding adjoining spoke band end, and are fastened together by the spoke brake fasteners, which pass through aligned holes in the spoke band and half-round spoke brakes.

13. The wheel of claim 8, wherein:
the plurality of diverters are symmetrically arranged around the central axle; and
the spoke band assembly is configured to move between the plurality of diverters and the central axle.

14. The wheel of claim 8, wherein the plurality of diverters are at least one of:
ball bearing cylindrical rollers;
flat plane rollers with a constant outer diameter along a length of the flat plane rollers;
concave rollers having an outer diameter that is narrowest in a center and widens toward ends of the concave rollers;
convex rollers, having an outer diameter that is widest at the center and narrows toward the ends of the convex roller;
rollers with a groove or apex at the center configured to influence the spoke bands toward the center of the diverters and away from the one or two spoke band retention flanges; and
rollers with an exterior rubber sleeve.

15. The wheel of claim 8, further comprising a tire around the flexible rim.

16. The wheel of claim 15, wherein the tire is mounted onto the flexible rim of the wheel as an adhesive-backed, composite rubber strip.

17. The wheel of claim 16, wherein at least one treaded outer layer of the adhesive-backed, composite rubber strip comprises a band of fabric-reinforced, neoprene rubber having a tire tread.

18. The wheel of claim 16, wherein the adhesive-backed, composite rubber strip comprises a tubing layer including transverse tubes.

19. A method comprising:
approaching an obstruction with a wheel, the wheel including:
a hub assembly;
a flexible rim;
a spoke band assembly extending from the hub assembly to the flexible rim to form a plurality of single-band spokes, the spoke band assembly comprising a plurality of distinct spoke bands;
wherein each spoke of the plurality of single-band spokes is formed from distinct spoke bands separated apart by a plurality of single band diverters and a plurality of dual band diverters;
wherein the plurality of single band diverters and the plurality of dual band diverters are part of the hub assembly, and each of the plurality of dual band diverters is configured to press against two adjacent spoke bands of the plurality of distinct spoke bands and rotate in the same direction as the two adjacent spoke bands, resulting in each of the two adjacent spoke bands traveling in opposite directions;
wherein each spoke has a spoke length defined to be a distance along the spoke from a point of contact of the spoke on the flexible rim to a point of origin of the spoke at the hub assembly; and
wherein the spoke band assembly is configured such that contact of the flexible rim with an object as the wheel moves forward causes the spoke length of a number of the spokes to shorten and the spoke length of an equal number of the spokes to lengthen; and
traversing over the obstruction through rotation of the wheel and wave motion of the wheel, wherein the wave motion includes a complementary shortening and elongating of the plurality of single-band spokes as the hub assembly travels along an advance spoke and the advance spoke rotates downward and becomes a grounded spoke, wherein the advance spoke is elongated and the grounded spoke is shortened, and wherein the complementary shortening and elongating of the plurality of single-band spokes is due to the dual band diverters pressing against the two adjacent spoke bands.

20. The method of claim 19, further comprising:
conforming the flexible rim to the obstruction through action of spoke hinge assemblies including universal hinge joints, configured to attach each spoke of the plurality of spokes to the flexible rim,
wherein the spoke hinge assemblies include a hinge collar, a shouldered fastener, and a hinge collar sleeve;
wherein the flexible rim maintains a memory of a desired shape; and
wherein the hinge collar, the shouldered fastener, the hinge collar sleeve, and the memory of the flexible rim configure the universal hinge joint to be spring-loaded and self-righting to a desired plumb position, allowing the wheel to conform to a terrain including the obstruction.

* * * * *